United States Patent
Migos et al.

(10) Patent No.: US 9,275,028 B2
(45) Date of Patent: Mar. 1, 2016

(54) CREATING AND VIEWING DIGITAL NOTE CARDS

(75) Inventors: Charles J. Migos, San Bruno, CA (US); Jay Christopher Capela, Santa Cruz, CA (US); Markus Hagele, San Francisco, CA (US); Alexander C. MacLean, San Jose, CA (US); M. Frank Emanuel, San Mateo, CA (US); Mac Murrett, Portland, OR (US); Paul Elseth, Washougal, WA (US); Kevin Smyth, Vancouver (CA)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/588,257

(22) Filed: Aug. 17, 2012

(65) Prior Publication Data

US 2013/0047115 A1    Feb. 21, 2013

Related U.S. Application Data

(60) Provisional application No. 61/525,701, filed on Aug. 19, 2011.

(51) Int. Cl.
*G06F 17/24* (2006.01)
*G06F 3/048* (2013.01)
*G06F 3/0483* (2013.01)
*G06F 3/0484* (2013.01)
*G06F 3/0488* (2013.01)

(52) U.S. Cl.
CPC .............. *G06F 17/241* (2013.01); *G06F 3/048* (2013.01); *G06F 3/0483* (2013.01); *G06F 3/0484* (2013.01); *G06F 3/04842* (2013.01); *G06F 3/04883* (2013.01)

(58) Field of Classification Search
CPC ...... G06F 17/241; G06F 3/048; G06F 3/0483; G06F 3/0484; G06F 3/04842; G06F 3/04883
See application file for complete search history.

(56) References Cited

U.S. PATENT DOCUMENTS

| | | | |
|---|---|---|---|
| 5,494,444 A | 2/1996 | Thayer et al. | |
| 5,539,427 A | 7/1996 | Bricklin et al. | |
| 7,148,905 B2 * | 12/2006 | Hong et al. | 345/629 |
| 2003/0076352 A1 | 4/2003 | Uhlig et al. | |
| 2005/0183004 A1 * | 8/2005 | Lerner et al. | 715/512 |
| 2006/0282778 A1 * | 12/2006 | Barsness et al. | 715/726 |
| 2007/0055926 A1 * | 3/2007 | Christiansen et al. | 715/512 |

(Continued)

OTHER PUBLICATIONS

Hong, Lichan, Ed H. Chi, and Stuart K. Card. "Annotating 3D electronic books." CHI'05 extended abstracts on Human factors in computing systems. ACM, 2005.*

(Continued)

*Primary Examiner* — William Bashore
*Assistant Examiner* — James F Sugent
(74) *Attorney, Agent, or Firm* — Fish & Richardson P.C.

(57) ABSTRACT

Systems, techniques, and methods are presented for creating digital note cards and presenting a graphical user interface for interacting with digital note cards. For example, content from an electronic book can be displayed in a graphical user interface. Input can be received in the graphical user interface highlighting a portion of the content and creating a note, the note including user generated content. A digital note card can be created where one side of the digital note card includes the highlighted text, and the other side of the digital note card includes the note. The digital note card can be displayed in the graphical user interface.

36 Claims, 37 Drawing Sheets

(56) References Cited

U.S. PATENT DOCUMENTS

| | | | |
|---|---|---|---|
| 2008/0222552 A1* | 9/2008 | Batarseh et al. | 715/776 |
| 2009/0077479 A1 | 3/2009 | Tucci | |
| 2009/0111084 A1 | 4/2009 | Mccarty | |
| 2009/0271381 A1* | 10/2009 | Beezer et al. | 707/3 |
| 2010/0095240 A1* | 4/2010 | Shiplacoff et al. | 715/784 |
| 2010/0324709 A1* | 12/2010 | Starmen | 700/94 |
| 2011/0060984 A1* | 3/2011 | Lee | 715/261 |
| 2011/0066965 A1 | 3/2011 | Choi | |
| 2011/0136094 A1* | 6/2011 | Weiler | 434/362 |
| 2012/0054672 A1* | 3/2012 | McDowell | 715/784 |
| 2012/0084634 A1* | 4/2012 | Wong et al. | 715/233 |

OTHER PUBLICATIONS

Schilit, Bill N., Gene Golovchinsky, and Morgan N. Price. "Beyond paper: supporting active reading with free form digital ink annotations." Proceedings of the SIGCHI conference on Human factors in computing systems. ACM Press/Addison-Wesley Publishing Co., 1998.*

Perera: "How to Highlight and Annotate eBooks with iBooks on Your iPad", GilsMethod.com, Mar. 8, 2011.

International Preliminary Report on Patentability for International Application No. PCT/US2012/051392 mailed Mar. 6, 2014, 9 pages.

* cited by examiner

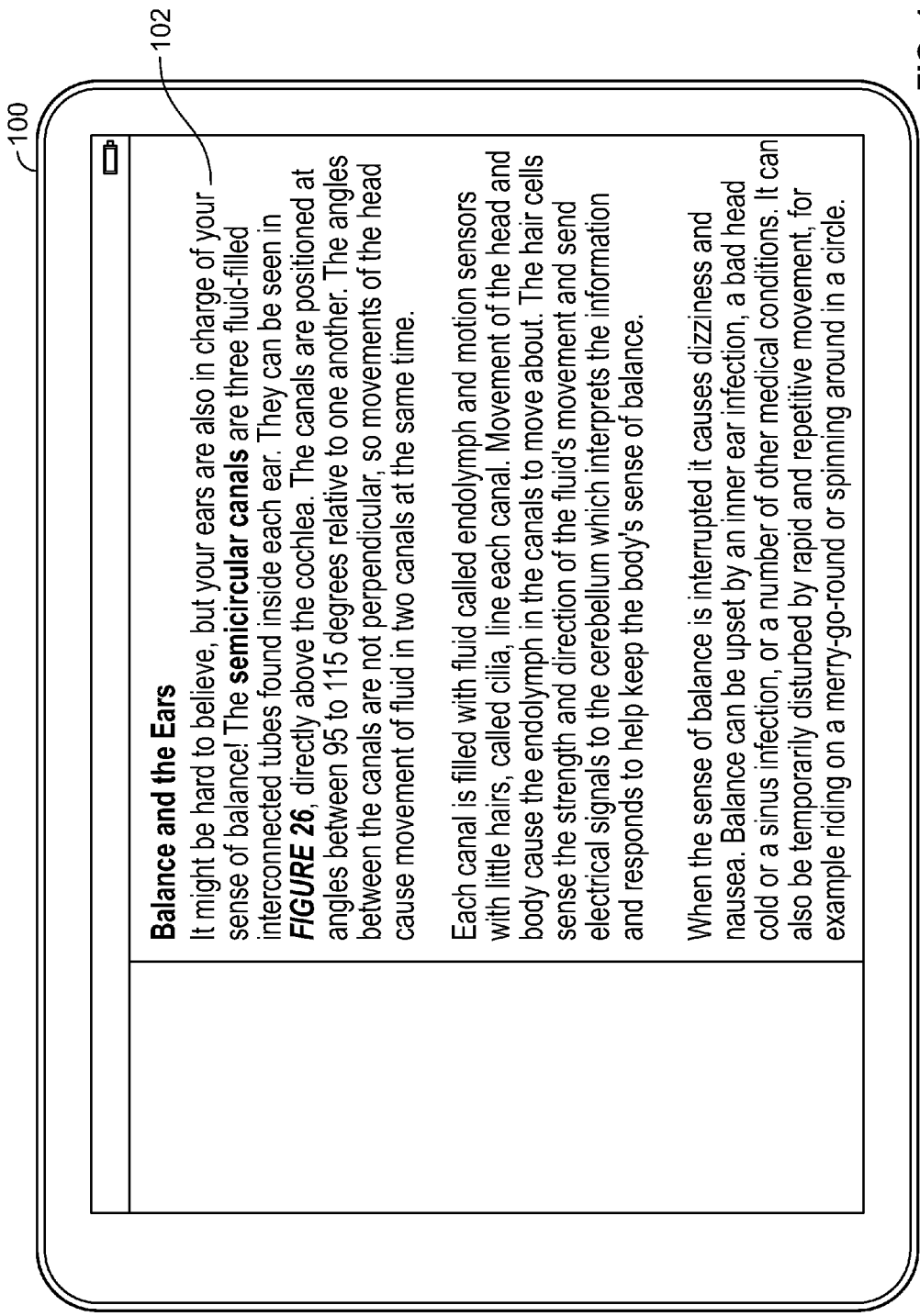

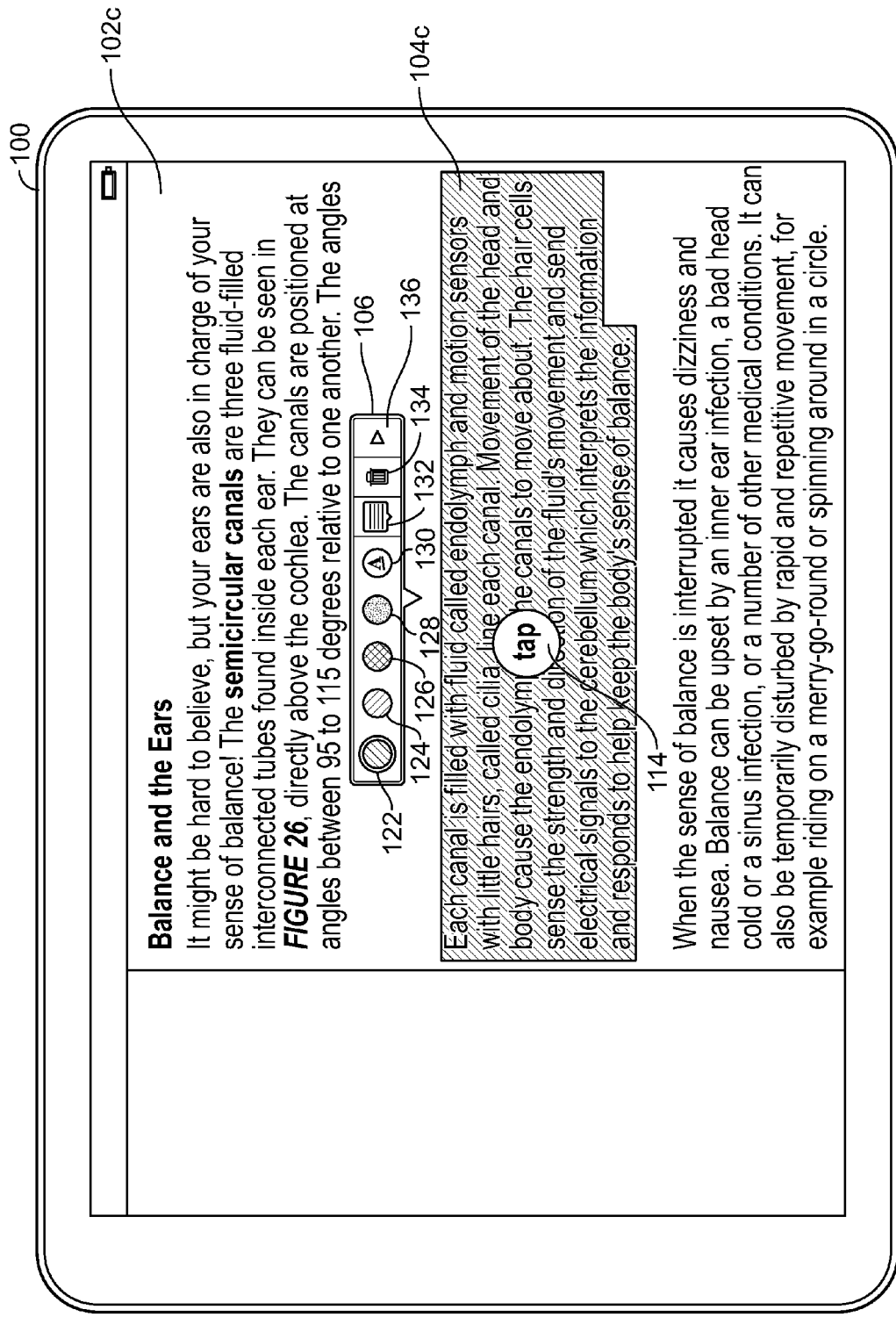

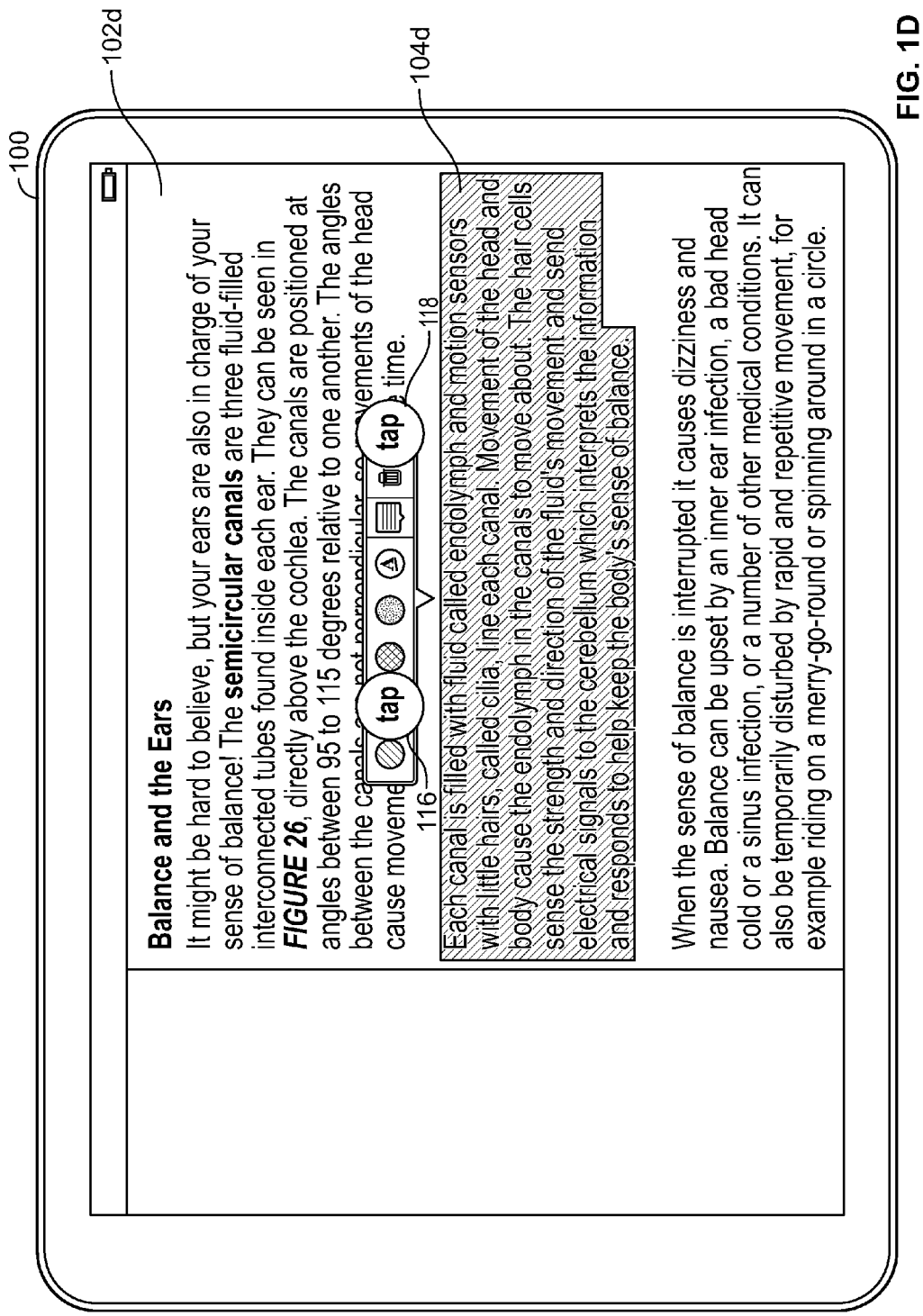

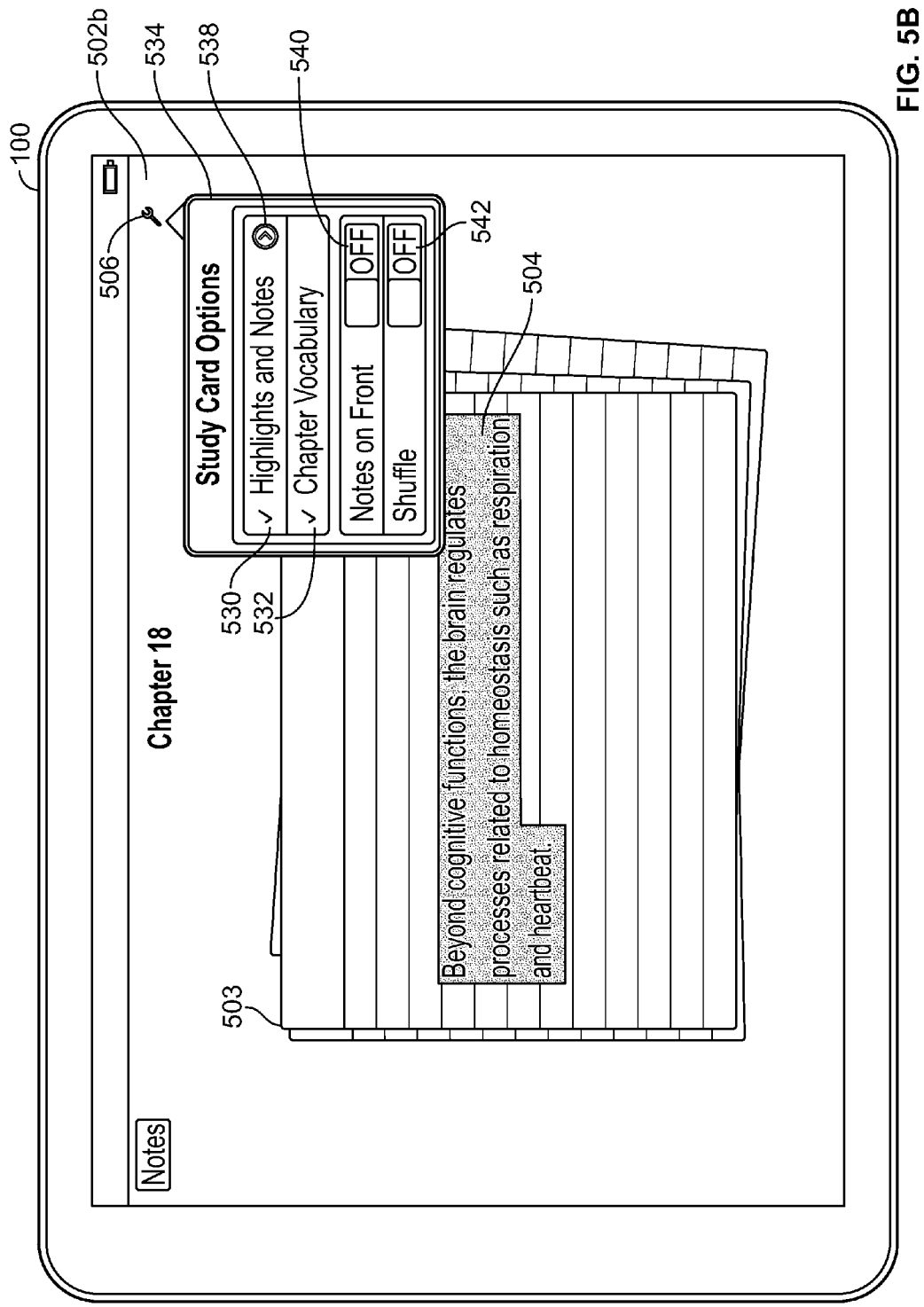

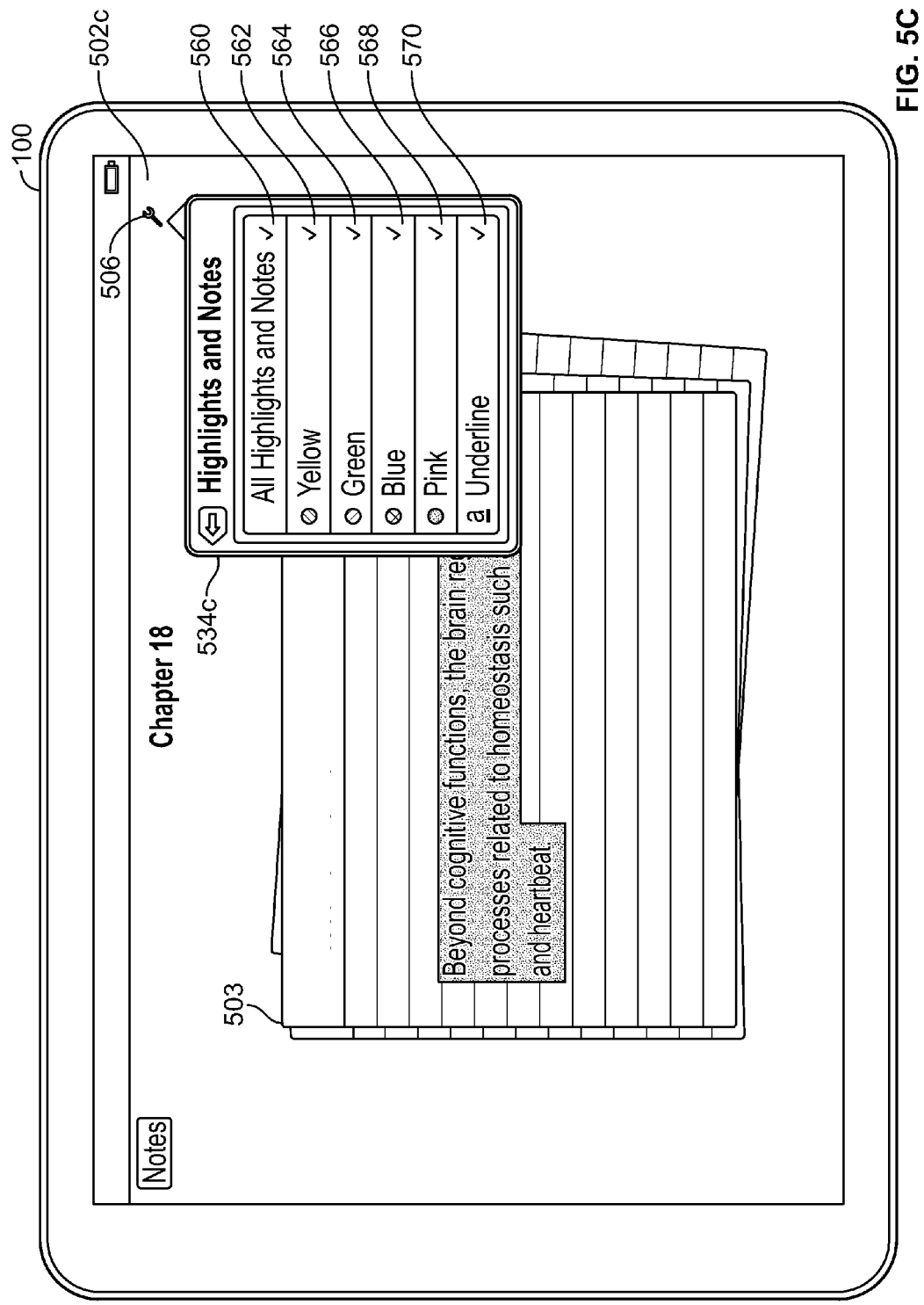

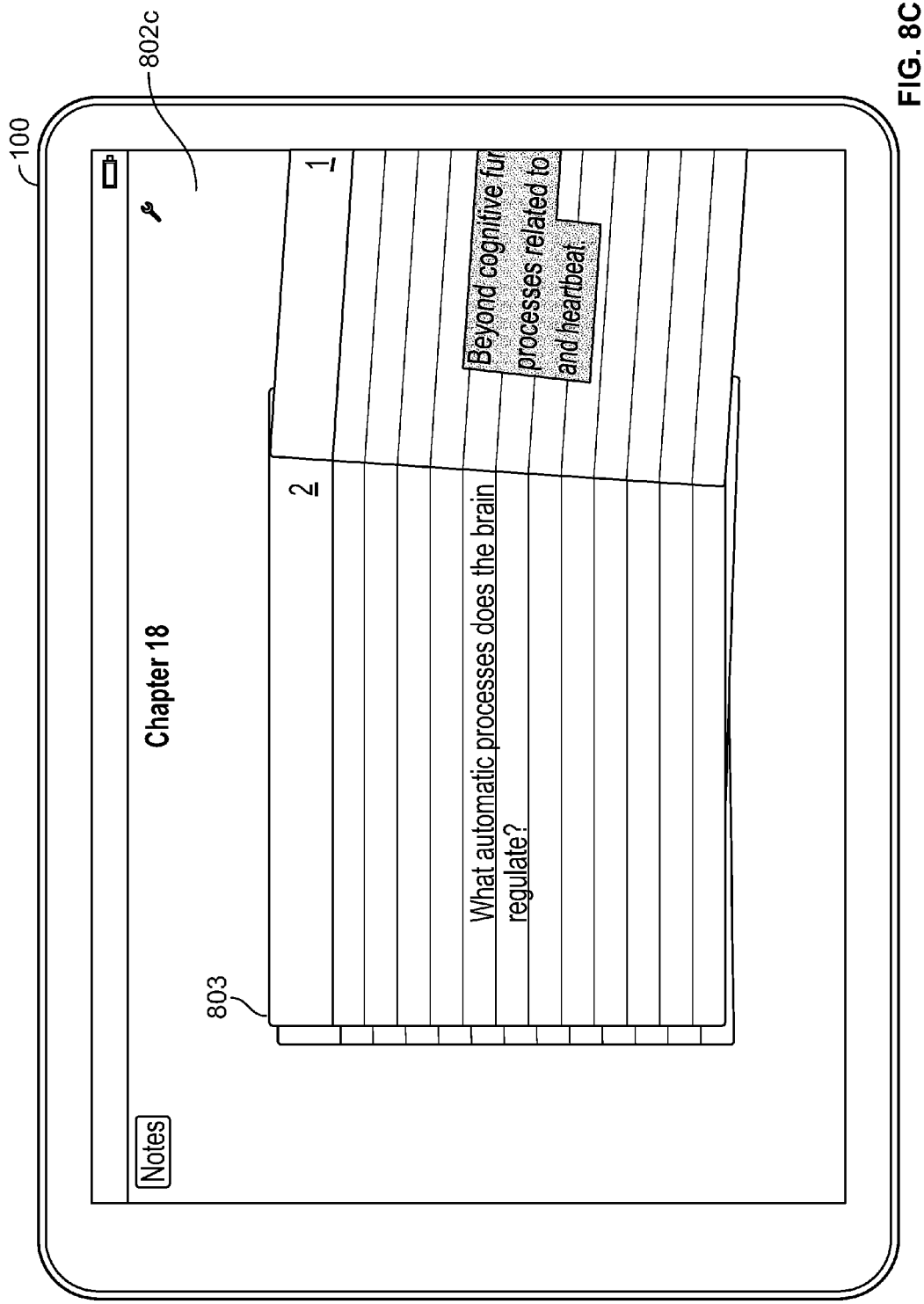

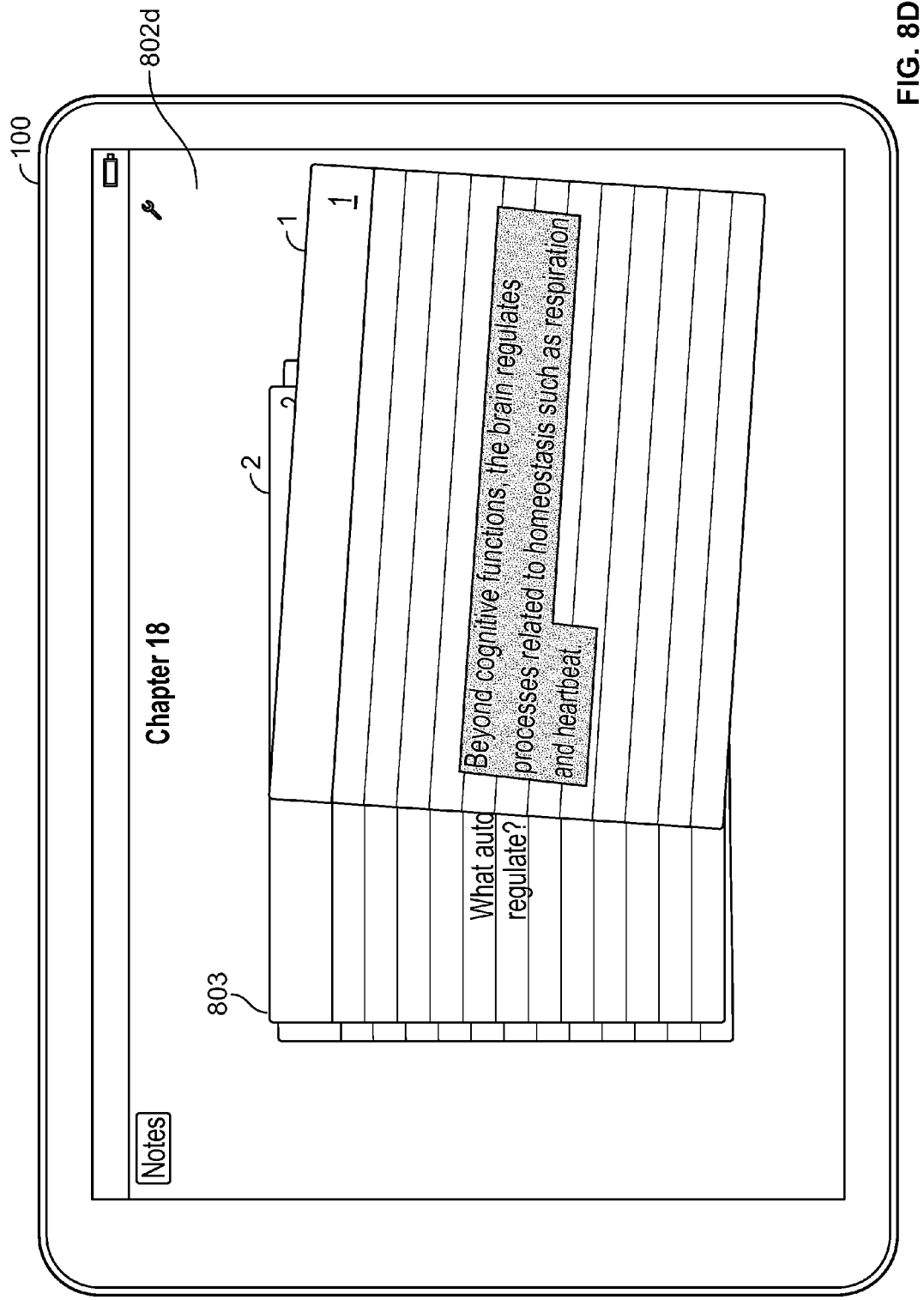

CREATING AND VIEWING DIGITAL NOTE CARDS

CROSS-REFERENCE TO RELATED APPLICATIONS

This application claims priority to U.S. Provisional Application Ser. No. 61/525,701, entitled "CREATING AND VIEWING DIGITAL NOTE CARDS", filed on Aug. 19, 2011, the entire contents of which are incorporated herein by reference.

TECHNICAL FIELD

This disclosure is related generally to electronic books (ebooks) and ebook reader applications.

BACKGROUND

Physical books provide a reader with the ability to augment the text presented on the pages of a book. For example, a reader can use a highlighter to highlight or underline text on a page in a physical book. The reader can also augment the text by writing notes and comments in line with the text or in the margins surrounding the text. To review the highlighted text, notes, or comments, the reader would need to revisit the physical pages containing the highlighted text, notes, or comments. Alternatively, a reader can make note cards and include text from a book, personal notes, and comments on the note cards.

Many types of display devices can be used to display text. For example, text from ebooks can be stored on and read from a digital device such as an electronic book reader (ebook reader), personal digital assistant (PDA), mobile phone, a laptop computer, a tablet computer, or the like. An electronic book can be purchased from an online store on the World Wide Web and downloaded to such a device. The device can have buttons for scrolling through the pages of the electronic book as the user reads.

SUMMARY

This disclosure describes technology, which can be implemented as a method, electronic device, and/or computer software embodied in a computer-readable medium, and which, among other things, can be used to create digital note cards and present a graphical user interface to interact with digital note cards.

In general, in one aspect, a method performed by one or more processes executing on a computer system includes displaying content from an electronic book in a graphical user interface, receiving first input highlighting a portion of the content, receiving second input creating a note, the note including user generated content, creating a first digital note card, where one side of the first digital note card includes the highlighted text, and the other side of the first digital note card includes the note, and displaying, in the graphical user interface, the first digital note card.

This, and other aspects, can include one or more of the following features. A stack of digital note cards may be displayed in the graphical user interface, where a front of the first digital note card can be displayed on the top of the stack, the front containing the highlighted text. Input may be received requesting to flip the first digital note card over and responsive to the received input request, the first digital note card can be flipped over in a series of graphical transitions, and a back of the first digital note card can be displayed in the graphical user interface, the back containing the note. Further, input requesting to move the first digital note card to the bottom of the stack of digital note cards can be received and responsive to the received input, the first digital note card can be visually moved to the bottom of the digital note card stack in a series of graphical transitions, and a front of a second digital note card can be displayed on the top of the digital note card stack, and at least a portion of the first digital note card can be displayed at the bottom of the digital note card stack. Further, input may be received requesting to move a second digital note card at the bottom of the digital note card stack to the top of the digital note card stack, and responsive to the received input, the second digital note card can be visually moved to the top of the digital note card stack in a series of graphical transitions, and a front of the second digital note card can be displayed on the top of the digital note card stack, and at least a portion of the first digital note card can be displayed below the second digital note card. The digital note cards contained in the digital note card stack can be dynamically filtered based on user feedback indicating a level of comprehension for at least one digital note card contained in the digital note card stack. The digital note cards in the digital note card stack can be filtered based at least in part on a color associated with the highlighted portion of content contained on the digital note cards. The digital note card stack may include, in addition to the first digital note card, a plurality of vocabulary digital note cards, where the front of the vocabulary digital note cards include a vocabulary word from a glossary of vocabulary words included with the ebook and a back of the vocabulary digital note cards include a corresponding definition of the vocabulary word.

The details of one or more implementations are set forth in the accompanying drawings and the description below. Other features, objects, and advantages will be apparent from the description and drawings, and from the claims.

DESCRIPTION OF DRAWINGS

FIGS. 1A-1I illustrate exemplary graphical user interfaces for interacting with content in an electronic book.

FIGS. 5A-5C illustrate exemplary graphical user interfaces for interacting with digital note cards.

FIGS. 8A-8E illustrate exemplary graphical user interfaces for moving a digital note card to the front of a digital note card stack.

Like reference symbols in the various drawings indicate like elements.

DETAILED DESCRIPTION

Example GUI for Viewing Digital Books

Figure 1B:
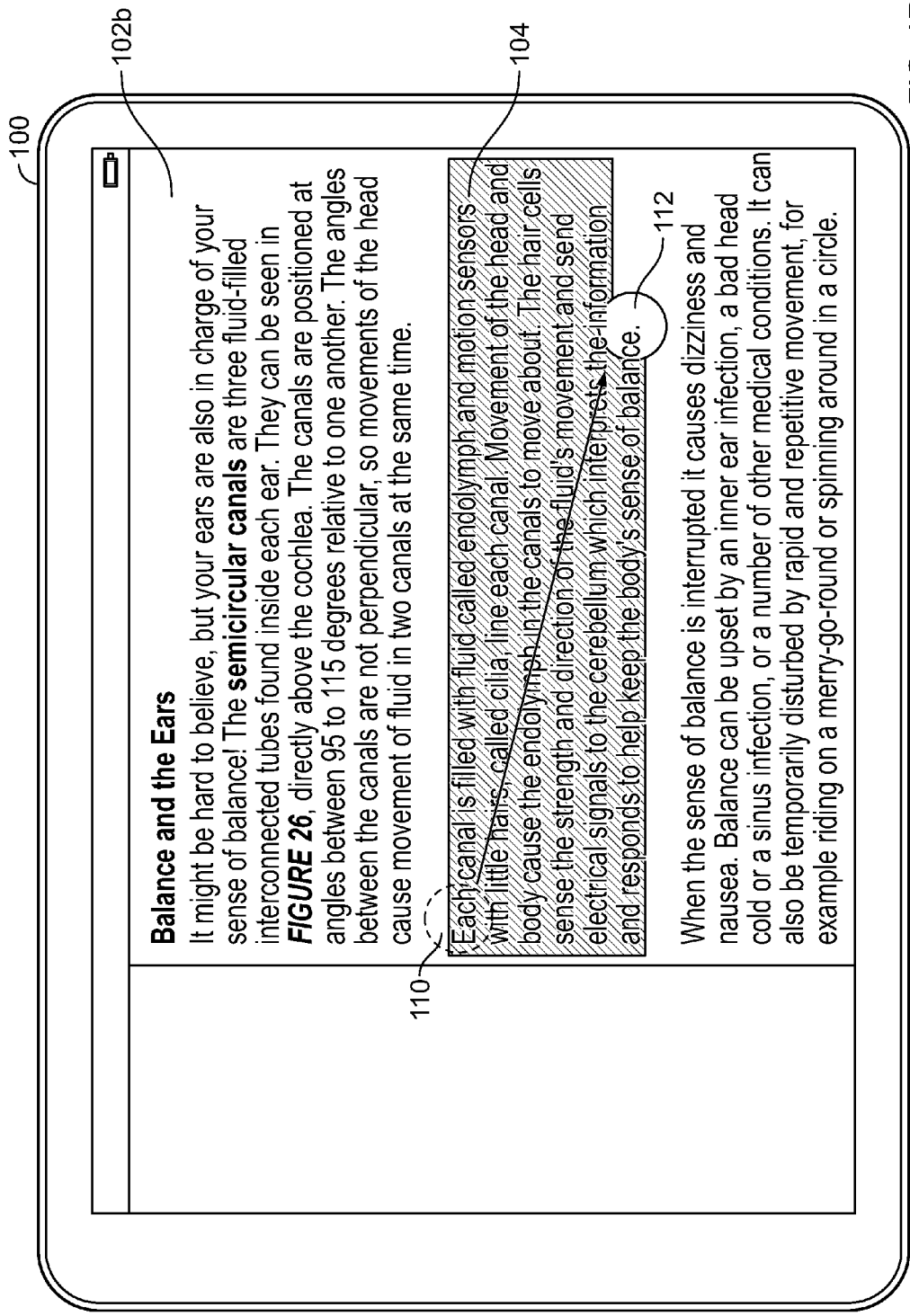

FIG. 1A illustrates an exemplary GUI for viewing and interacting with content in an electronic book ("ebook"). In some implementations, a content display device 100 can include GUI 102 for viewing and interacting with content in an ebook. For example, GUI 102 can be configured to present content contained in an ebook and receive user input interacting with the content. User input received by GUI 102 can cause content display device 100 to, for example, visually distinguish a selected portion of content, create a note and associate the note with particular content, create digital note cards, and display digital note cards. GUI 102 can be generated by a computer program (e.g., an electronic book application) executing on one or more processors or processing cores of a data processing apparatus, including, but not limited to: laptop computer, desktop computer, tablet computer, e-book readers, and smart phones. In some implementations, GUI 102 can be a Web page generated by a web-based electronic book application hosted on a server computer and sent to a client device over a network (e.g., the Internet).

In some implementations, GUI 102 of content display device 100 can be a touch-sensitive surface. The touch sensitive surface can receive user input through various input techniques. Example touch surface inputs include touch inputs and gesture inputs. A touch input is an input where a user holds his or her finger (or other input tool) at a particular location. A gesture input is an input where a user moves his or her finger (or other input tool). An example gesture input is a swipe input, where a user swipes his or her finger (or other input tool) across the screen of a touch-sensitive surface. In some implementations, inputs can be in direct contact with a touch-sensitive surface, or within a particular vertical distance of a touch-sensitive surface (e.g., within one or two inches of a touch-sensitive surface). Users can simultaneously provide input at multiple locations on a touch-sensitive surface. For example, inputs simultaneously touching at two or more locations can be received. Example touch surface input types can include but are not limited to: swipe, press-and-hold, tap, double-tap, flick, pinch, multiple finger tap, multiple finger press-and-hold, and press-and-slide.

Example GUI for Highlighting and Viewing Content in a Digital Book

In some implementations, content display device 100 can implement various device functionalities. As part of one or more of these functionalities, content display device 100 can present GUI 102 on a touch-sensitive surface of content display device 100. Graphical user interface 102 can respond to input received from a user, for example, through the touch-sensitive surface. For example, a user can invoke an electronic book application on the device for accessing a stored electronic book ("ebook").

In some implementations, a user can visually distinguish portions of text contained in an ebook presented in GUI 102. For example, while reading an ebook, a user can select text and elect to visually distinguish the selected text by highlighting the text (e.g., with a background color or pattern) or applying another visually distinguishing quality to the text (e.g., underling, italics, strike-through, bold, etc.). A highlight can be visually displayed on GUI 102 using any suitable color (e.g., yellow, green, blue, purple), or any suitable background pattern (e.g., checkered, horizontal stripes, vertical stripes, etc.)

In some implementations, a user can elect to create a note and attach/associate the note with selected text in an ebook. For example, a user can select a portion of text displayed in GUI 102 and, through one or more controls presented on GUI 102, the user can elect to create and attach a note with the selected text. In some implementations, a note can include text input by a user through a virtual keyboard displayed on GUI 102. In other implementations, a note can include any number of suitable media forms. For example, a note can include embedded audio, video, HTML, hypertext, and the like.

FIG. 1B illustrates an exemplary GUI 102b for visually distinguishing text in an electronic book. In some implementations, highlight 104 can be applied to text from an ebook presented in GUI 102b in response to user input received by GUI 102b. In some implementations, a user may select text using any suitable input technique, such as those described above, for interacting with the touch sensitive surface of GUI 102b. In some implementations, a default highlight color can be used for highlight 104 and can be applied to selected text automatically upon selection of the text. For example, highlight 104 can be applied automatically when a predefined user selection input is received. A predefined user input for automatically highlighting text may, for example, include a single tap and hold at input position 110, followed by a swipe to input position 112, and a release at input position 112. Upon release at input position 112, selected text in the electronic book can be visually distinguished by highlight 104. In other implementations, a highlight will not be applied to selected text until a specific request is received by GUI 102b to apply a highlight to selected text. For example, upon receipt of a predefined user selection input, GUI 102b may select text, but not apply a highlight to it. A predefined user input for selecting text but not automatically highlighting the selected text may, for example, include a double tap at input position 110 followed by a swipe or drag (e.g., expanding a selection box) to input position 112.

FIG. 1C illustrates an exemplary heads-up display (HUD) for altering a property of a highlight or adding a note to a highlighted portion of text. HUD 106 may be displayed in GUI 102c in response to user input selecting text, as described above in the description of FIG. 1B, or in response to a user input received on a previously highlighted portion of text. For example, upon receiving a tap at input position 106 on text previously highlighted with highlight 104c, HUD 106 can be presented in GUI 102c. In some implementations, HUD 106 includes options for changing a property of highlight 104c, adding a note to the text highlighted by highlight 104c, or removing highlight 104c. For example, HUD 106 can contain any suitable number of alternative highlight visualizations 122 124, 126, 128, and 130. In some implementations, highlight visualizations 122-128 correspond to colors (e.g., yellow, green, blue, pink, etc.) and highlight visualization 130 corresponds to a text underline feature. A user may change the highlight visualization of highlight 104c by, for example, tapping the desired visualization 122-130 on GUI 102c. For example, in FIG. 1D, a user tap has been received at input position 116 on GUI 102d to change the visualization of highlight 104d to highlight visualization 122 (e.g., the color green).

In some implementations, a user can add a note to highlight 104c by selecting note button 132 in HUD 106. For example, in response to tap input selecting note button 132, GUI 102*h* shown in FIG. 1H can be presented on content display device 100. As described below, GUI 102*h* provides a user interface for a user to input content to be included in note attached to highlighted text.

Figure 1E:
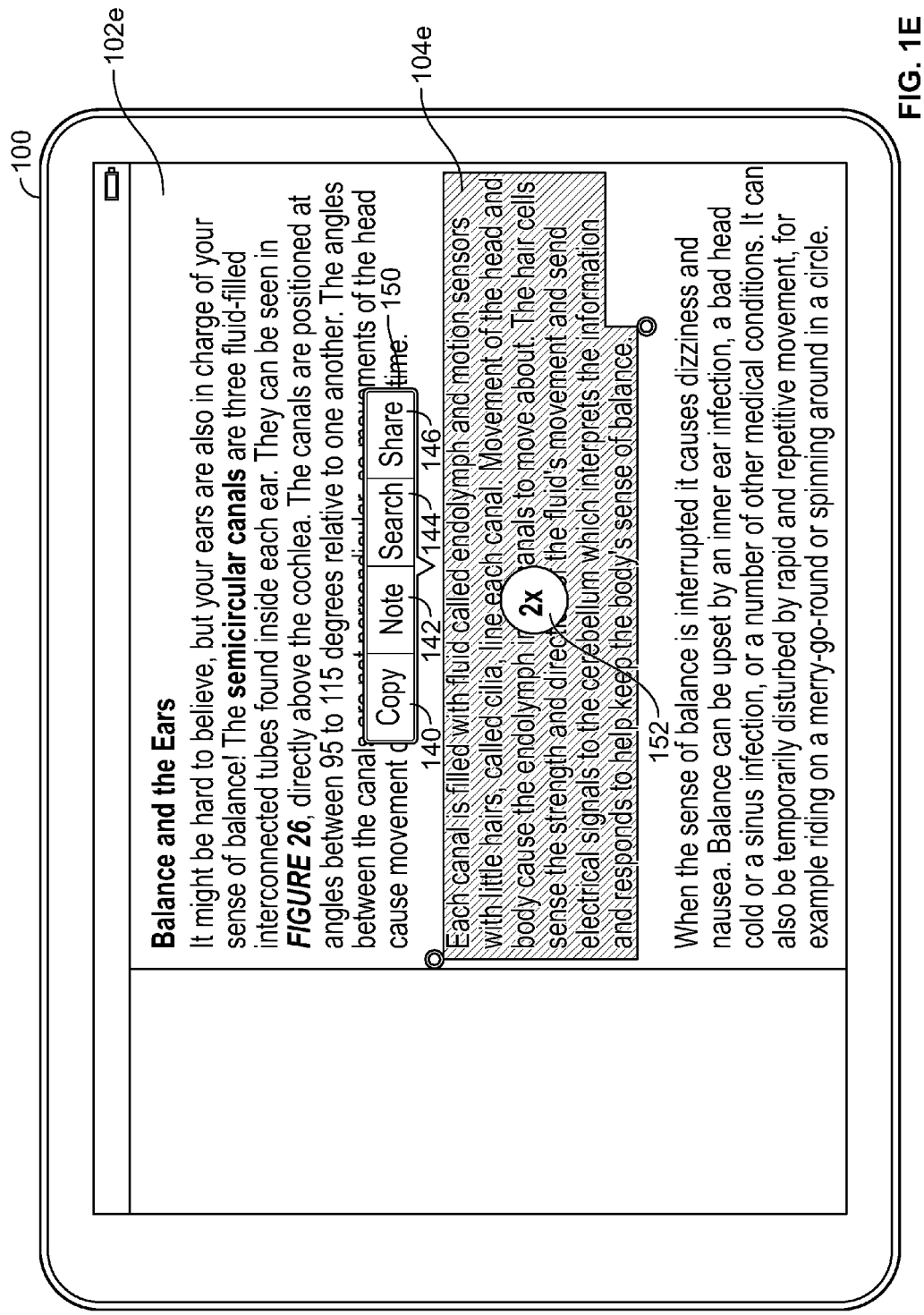

In other implementations, a user can delete highlight 104*c* by selecting delete button 134 in HUD 106. In other implementations, a user can navigate to additional context menus for HUD 106 by selecting button 136. For example, in response to a user tap at input position 118 in FIG. 1D, additional context menu items 140, 142, 144, and 146, can be displayed in HUD 150, shown in FIG. 1E. In some implementations, copy button 140 corresponds to a copy feature for copying the text highlighted by highlight 104*e*, copy button 142 corresponds to a note option for creating and attaching a note to highlighted text 104*e*, search button 144 corresponds to a search option for searching the text highlighted by highlight 104*e*, and share button 146 corresponds to a share option, for sharing the text highlighted by highlight 104*e*. In some implementations, context menu 150 can be presented on GUI 102*e* in response to receiving a double tap input at input position 152 on previously highlighted text 104*e*.

Figure 1F:
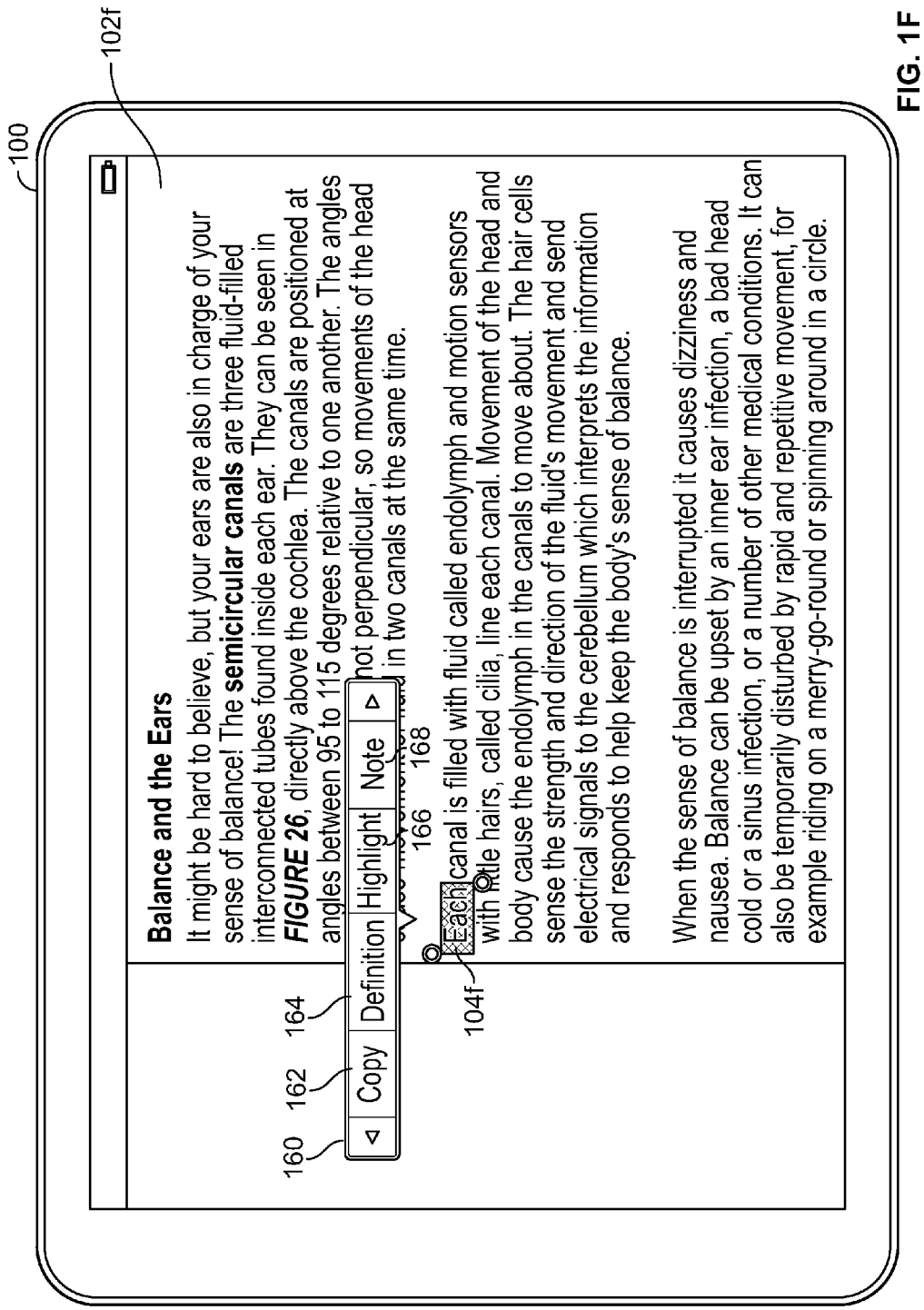

FIG. 1F illustrates an exemplary HUD 160 presented in GUI 102*f* in response to a selection of an amount of text below a threshold limit. In some implementations, HUD 160 can be presented in GUI 102*f* in response to selection of a single word, or a phrase containing less than a predetermined number of words or text. For example, HUD 160 can be presented in GUI 106*f* when three or fewer words are selected by selection 104*f*. In addition to providing options for copying the selected text 162, highlighting the selected text 166, and adding a note to the selected text 168, HUD 160 can also present an option 164 for displaying a definition, if one exists, for the selected text.

Figure 1G:
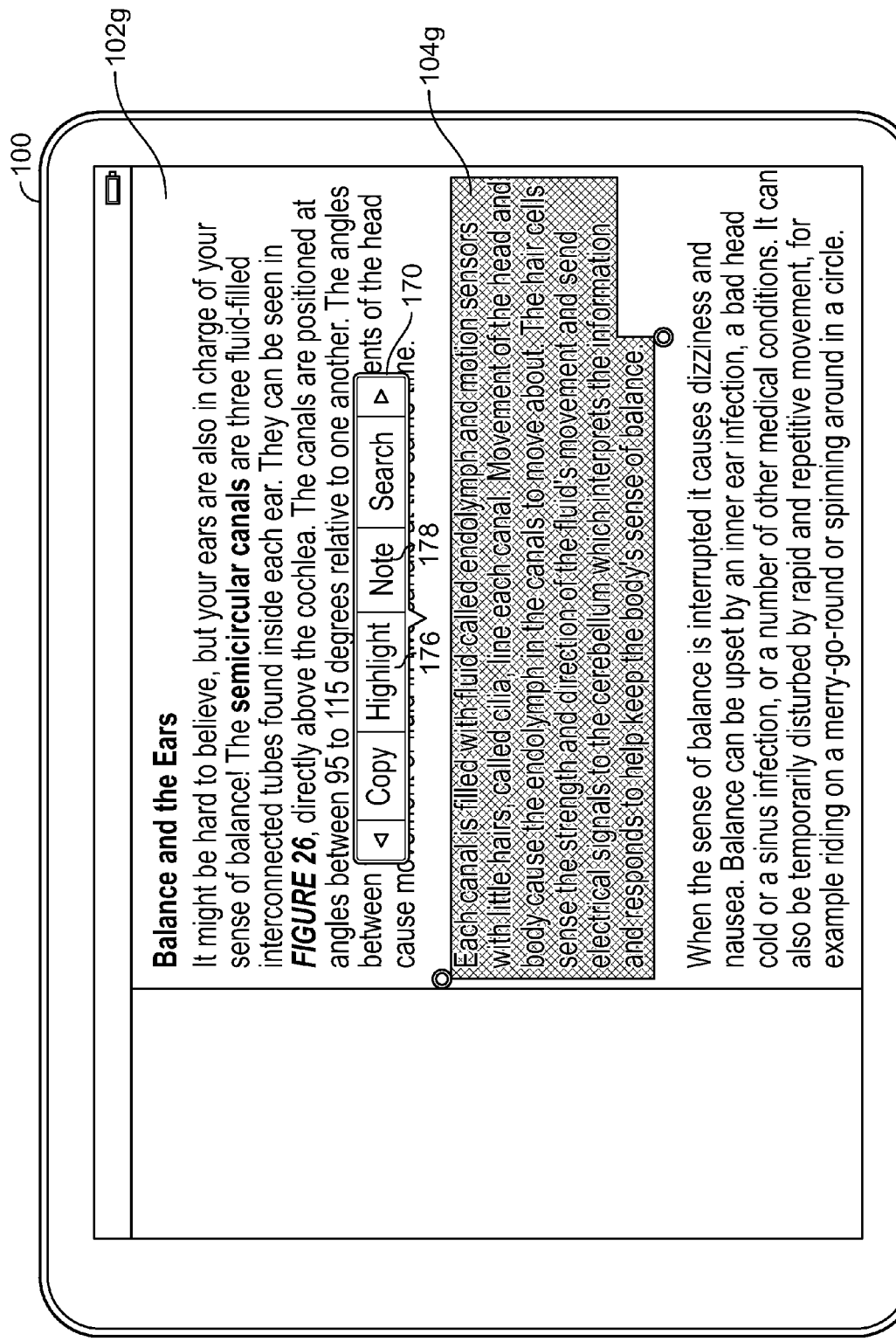

FIG. 1G illustrates an exemplary HUD 170 presented in GUI 102*g* in response to a selection of an amount of text above a threshold limit. In some implementations, HUD 170 can be presented in GUI 102*g* in response to selection of text containing more than a predetermined number of characters or words. HUD 170 can differ from HUD 160 in FIG. 1F in that HUD 170 does not include a definition option because the selected text 104*g* is above a threshold limit. Upon selection of highlight option 176, the selected text can be highlighted, if not automatically highlighted in connection with an input technique described above, and highlight HUD 106 shown in FIG. 1C can be displayed.

Figure 1H:
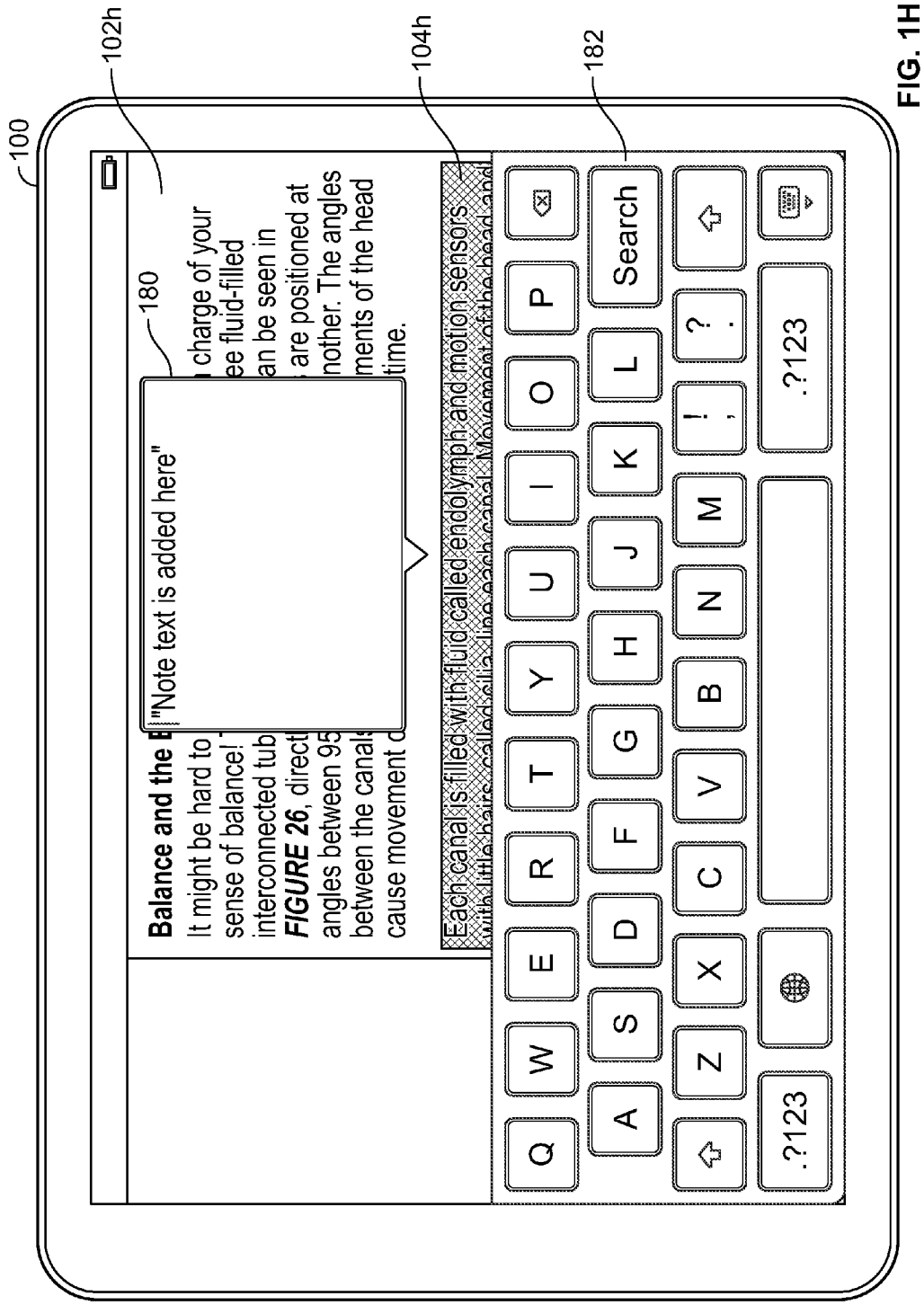

FIG. 1H illustrates an exemplary GUI 102*h* for adding a note to highlighted text 104*h*. In some implementations, a user may add content to note 180 through virtual keyboard 182. In other implementations, a user can add other media to note 180. For example, audio (voice recordings), video, hypertext, html, and the like may also be included in note 180.

Figure 1I:
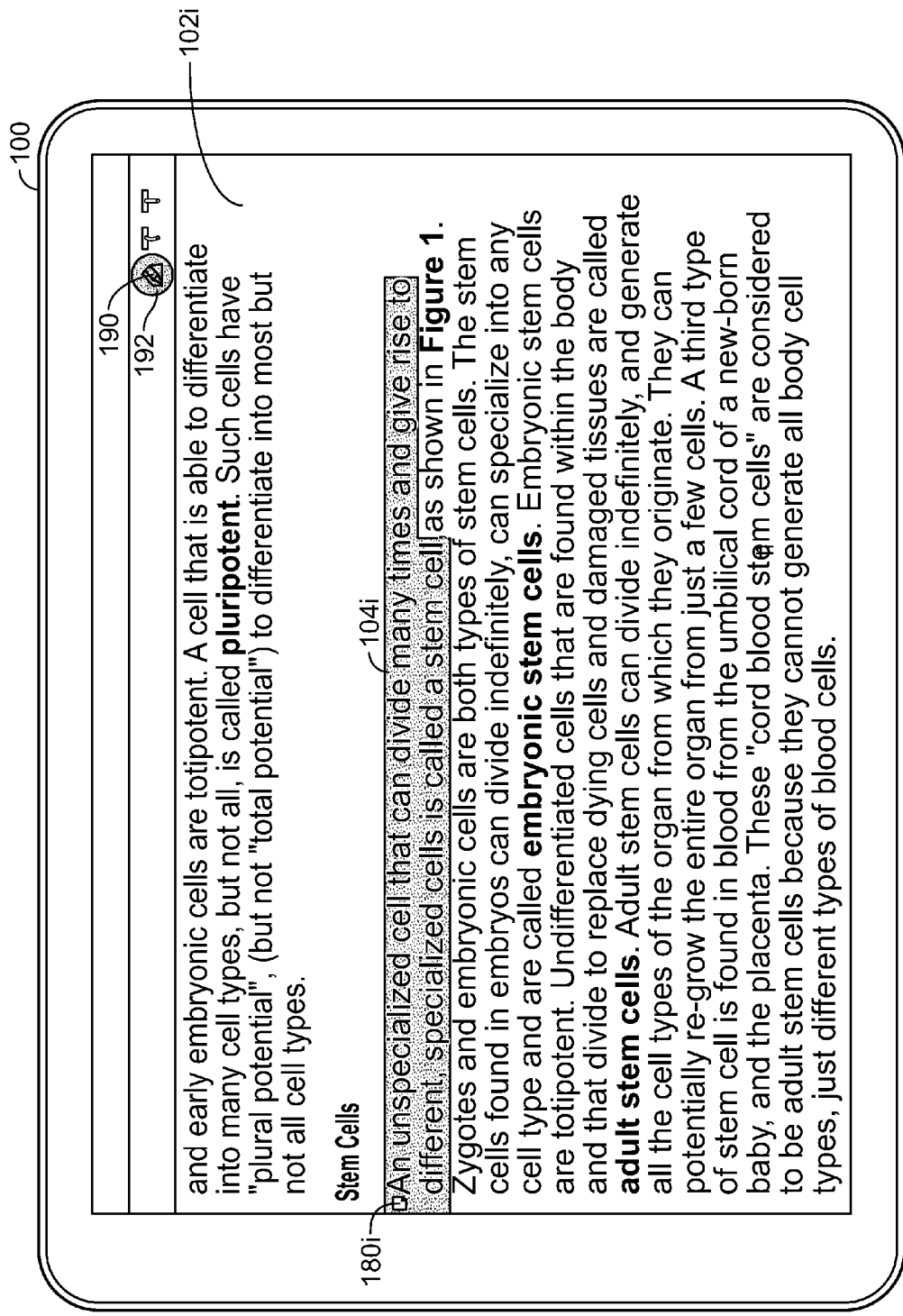

FIG. 1I illustrates an exemplary GUI 102*i* for viewing and interacting with content in an ebook. In some implementations, content displayed in GUI 102*i* can include previously highlighted text and notes associated with previously highlighted text. For example, GUI 102*i* can contain highlighted text 104*i* and note icon 180*i*. Highlighted text 104*i* can be text previously highlighted in accordance with the techniques described above. Note icon 180*i* can indicate that a note has previously been associated with highlighted text 104*i* (e.g., in accordance with the techniques described above). In some implementations, a user may select additional text in GUI 102*i* to highlight and associate notes with. A user may also select note icon 180*i* to edit the corresponding note. For example, selecting note icon 180*i* can cause note edit screen 180 and virtual keyboard 182 shown in FIG. 1H to be displayed in GUI 102*i*, with the previously entered note text pre-populated in the note edit screen 180. GUI 102*i* can include notes button 190 to toggle between page view GUI 102*i* and notes view GUI 200, shown in FIG. 2. Upon receiving user input 192 (e.g., a tap) selecting notes button 190, notes view GUI 200 shown in FIG. 2 can be displayed on content device 100.

Figure 2:
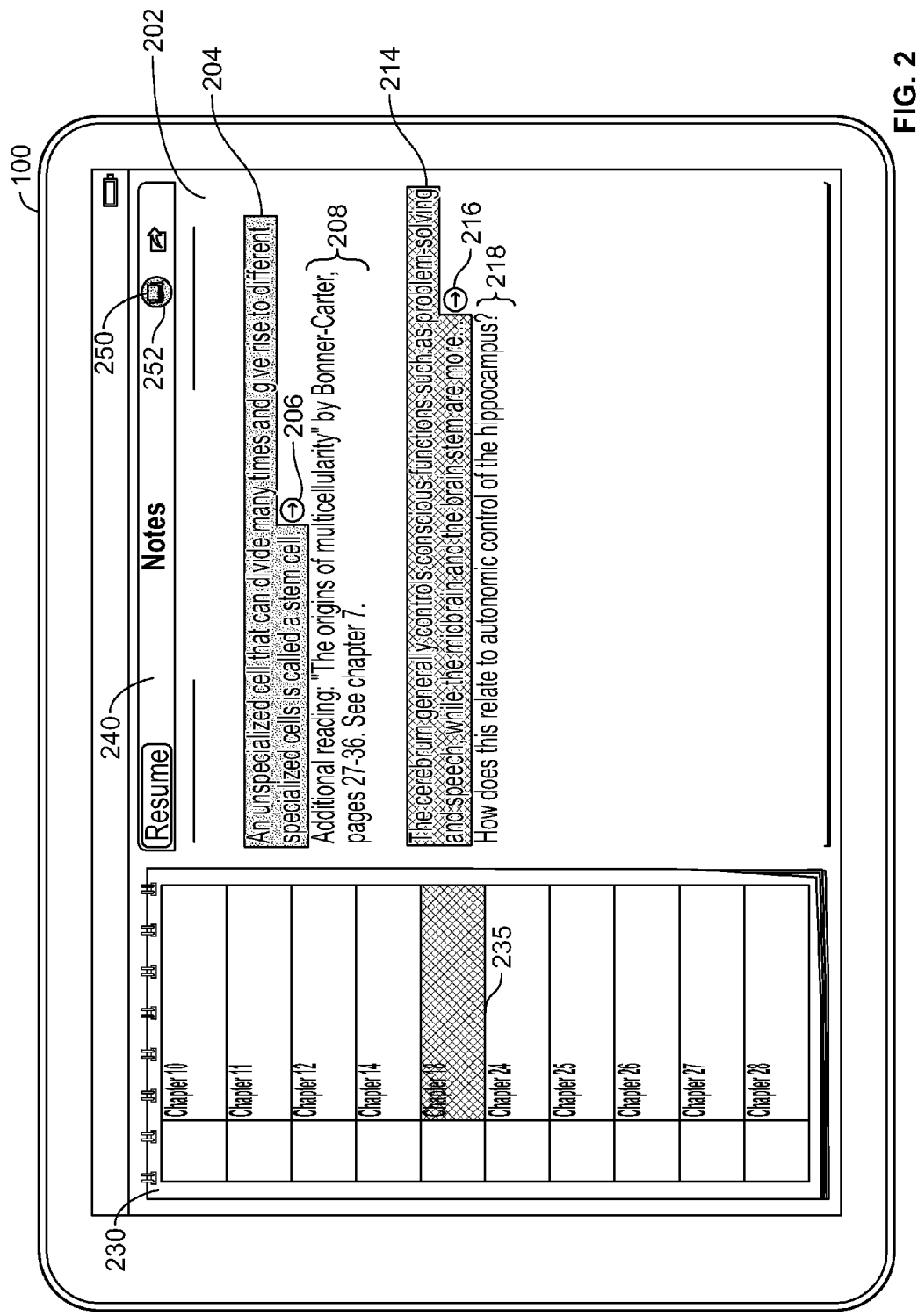
FIG. 2 illustrates an exemplary graphical user interface for viewing highlighted text and notes corresponding to highlighted text.

FIG. 2 illustrates an exemplary GUI 202 for viewing highlighted text and notes corresponding to highlighted text. In some implementations, GUI 202 can contain a navigation window 230 and a notes view window 240. Navigation window 230 can include a list of chapters from an ebook. For example, navigation window 230 can include a listing of all chapters contained in an ebook or it can be filtered to only include chapters in which text has been highlighted or notes have been attached to text. Notes view window 240 can include highlighted text and corresponding notes contained in the chapter selected at 235 in navigation window 230. For example, notes window 240 can display in GUI 202 highlighted text 204 and 214 and corresponding notes 208 and 218. In some implementations, a user may elect to go to the page in the ebook where the highlighted text is contained by, for example, tapping or clicking on highlighted text 204 or 214. In some implementations, in response to a tap or click input selecting note 208 or note 218, an edit GUI (e.g., GUI 102*h* in FIG. 1H) can be presented on content display device 100 providing editing functionality for the contents of note 208 or 218. In some implementations, upon receiving a tap input on button 206 or button 216, note 208 or note 218, respectively, can be removed from view in GUI 202. Similarly, if note 208 or 218 is not viewable in GUI 202, a user may tap button 206 to reveal note 208 or button 216 to reveal note 218.

In some implementations, highlights presented in notes view 240 can be filtered by a highlight property associated with the highlights. For example, notes view 240 can be filtered such that only highlights with particular highlight color are displayed in notes view 240.

In some implementations, GUI 202 includes note cards button 250 to toggle between GUI 202 and a note cards view (e.g., GUI 502 shown in FIG. 5). If no highlights or notes exist for a chapter selected in navigation window 230 and no vocabulary terms are available for the current chapter, notecards button 250 can be disabled.

Figure 3:
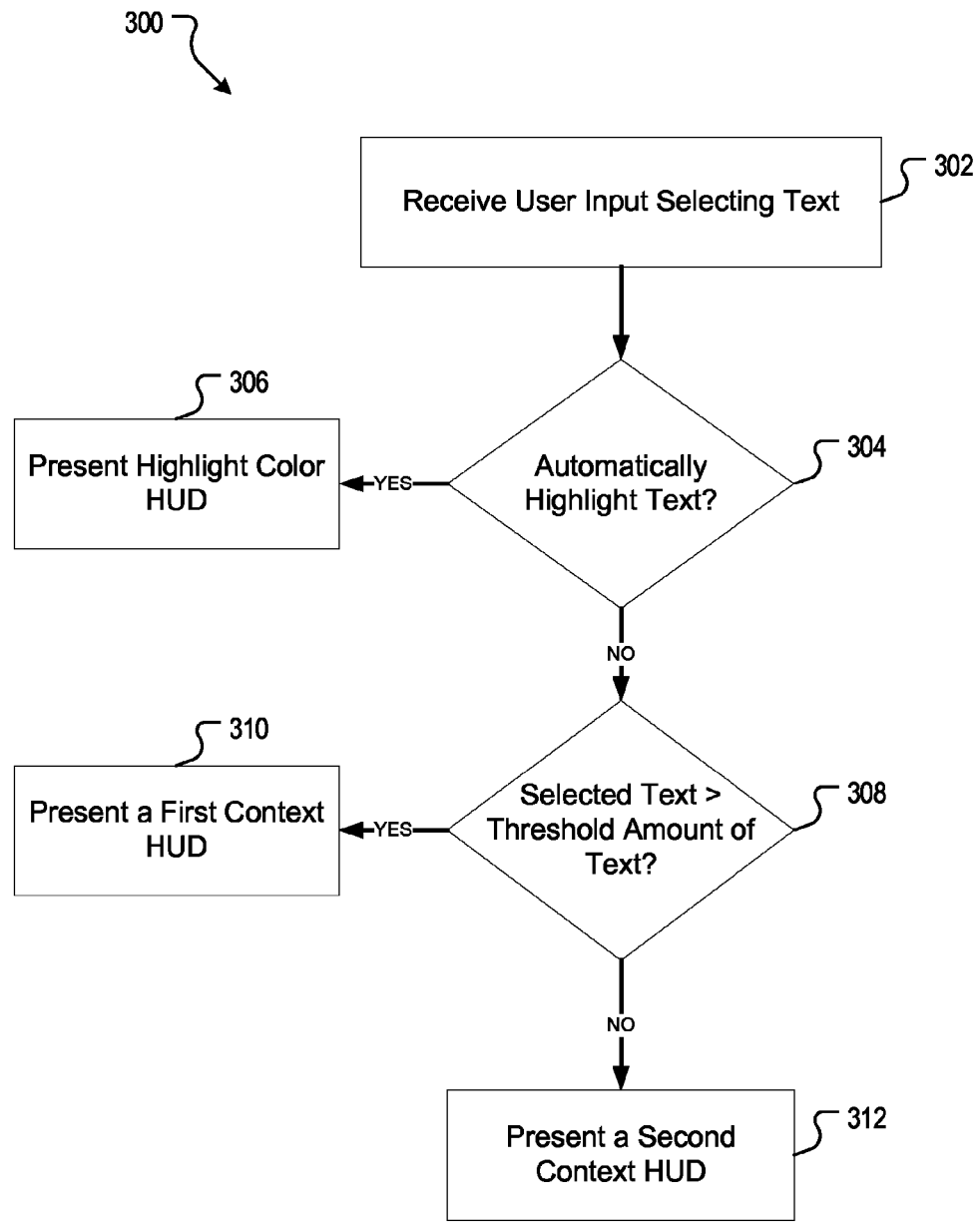
FIG. 3 shows an example process for presenting a heads-up display in response to a selection of content in an electronic book.

FIG. 3 shows an example process for presenting a heads-up display in response to a selection of content in an electronic book. User input selecting text may be received at 302 on a touch-sensitive surface of a graphical user interface (e.g., GUI 102*b*) of a content display device (e.g., content display device 100). At 304, content display device 100 can determine whether the input received at 302 results in the selected text automatically being highlighted. For example, if the input received at 302 matches predefined input criteria, the text selected at 302 can be automatically highlighted and a highlight color HUD (e.g., highlight color HUD 106) can be presented on the content display device. Alternatively, if input received at 302 does not match predefined criteria for automatically highlighting text, content display device 100 can determine whether the text selected by the input received at 302 is greater than a threshold amount of text. If the text selected by the input received at 302 is greater than a threshold amount of text, a first context display HUD can be presented (e.g., context display HUD 170 in FIG. 1G) where a button to define the selected text is not an option in the HUD. Alternatively, if the selected text received at 302 is less than a threshold amount, then a second context display HUD can be presented (e.g., context display HUD 160 in FIG. 1F) where a button to define the selected text is an option (e.g., Definition button 164) in the HUD.

Figure 4A:
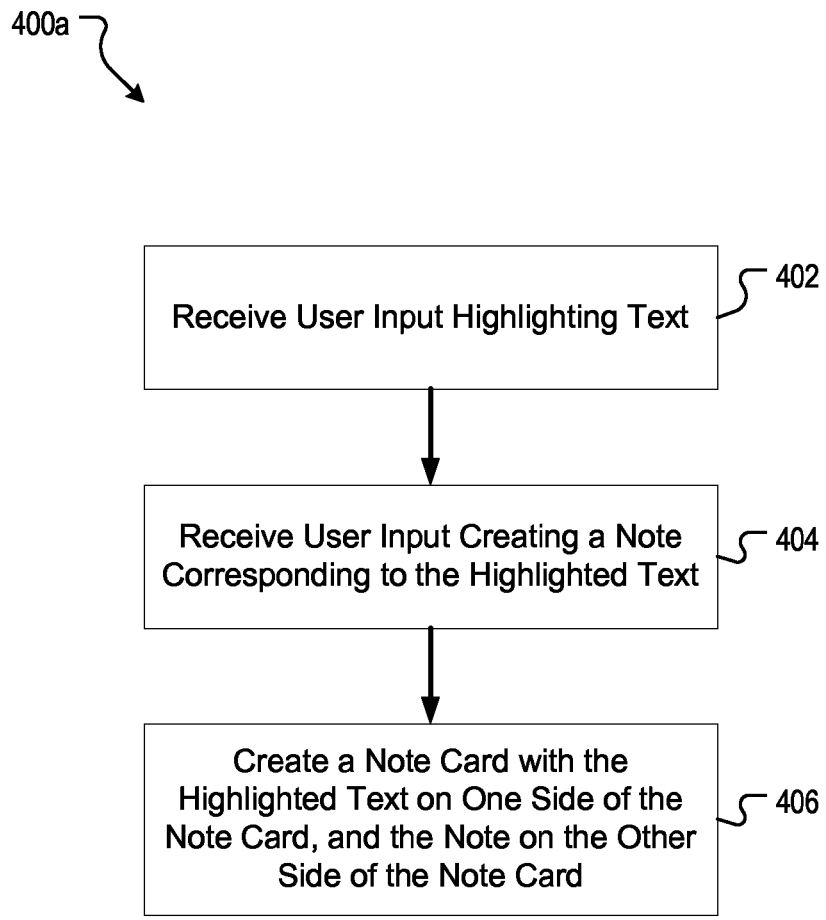
FIGS. 4A-4B show example processes for creating a digital note card.
Figure 4B:
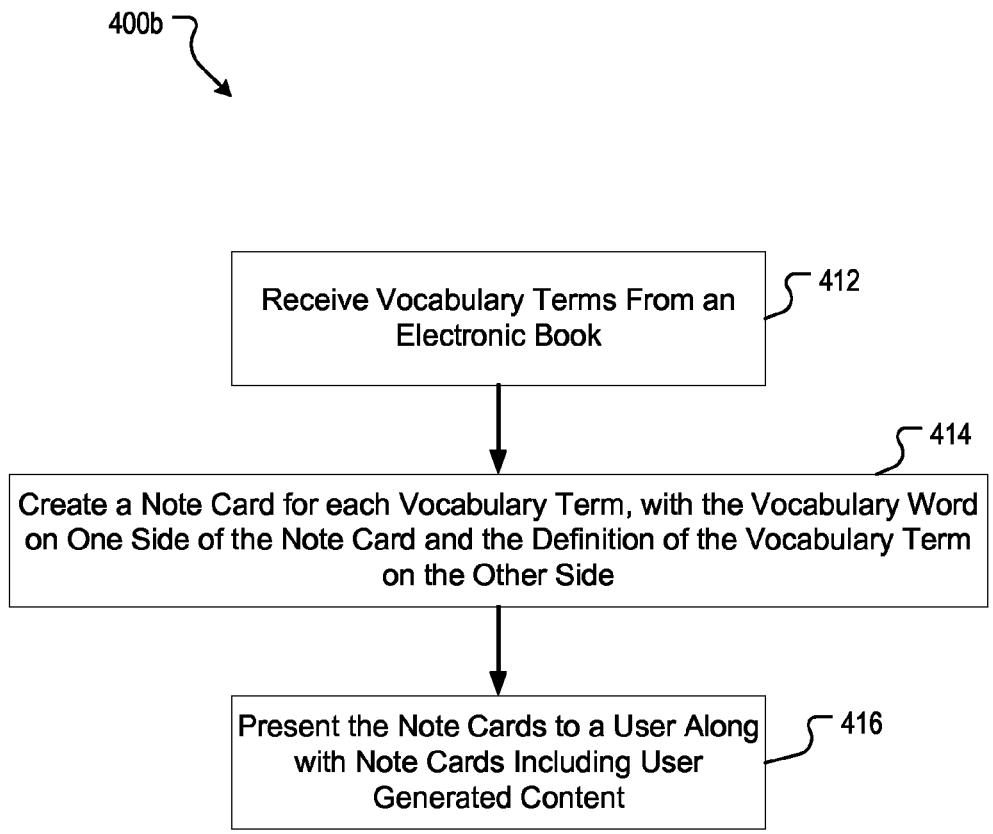

FIGS. 4A-4B show example processes for creating a digital note card. In FIG. 4A, a digital note card can be created from highlighted text and notes associated or added to the highlighted text. At 402, a content display device (e.g., content display device 100) can receive user input highlighting text in an ebook. At 404, content display device 100 can further receive user input creating a note to attach or associate with the highlighted text. At 406, content display device 100 can create a note card, where the highlighted text received at 402 is on one side of the note card and the note received at 404 is on the other side (flip side) of the note card.

In FIG. 4B, digital note cards can be created from vocabulary terms included in a glossary of an electronic book. At 412, content display device 100 can receive vocabulary terms from an electronic book, for example, from a glossary created by a user of the ebook. At 414, a note card can be created for each vocabulary term included in the glossary, where a vocabulary word is on one side of the note card, and the corresponding definition for the vocabulary word is on the other side of the note card. At 416, the vocabulary note cards can be presented (e.g., as described below) to a user of content display device 100 along with the user generated content note cards created by the process described in connection with FIG. 4A.

Example GUI for Viewing Digital Note Cards

Figure 5A:
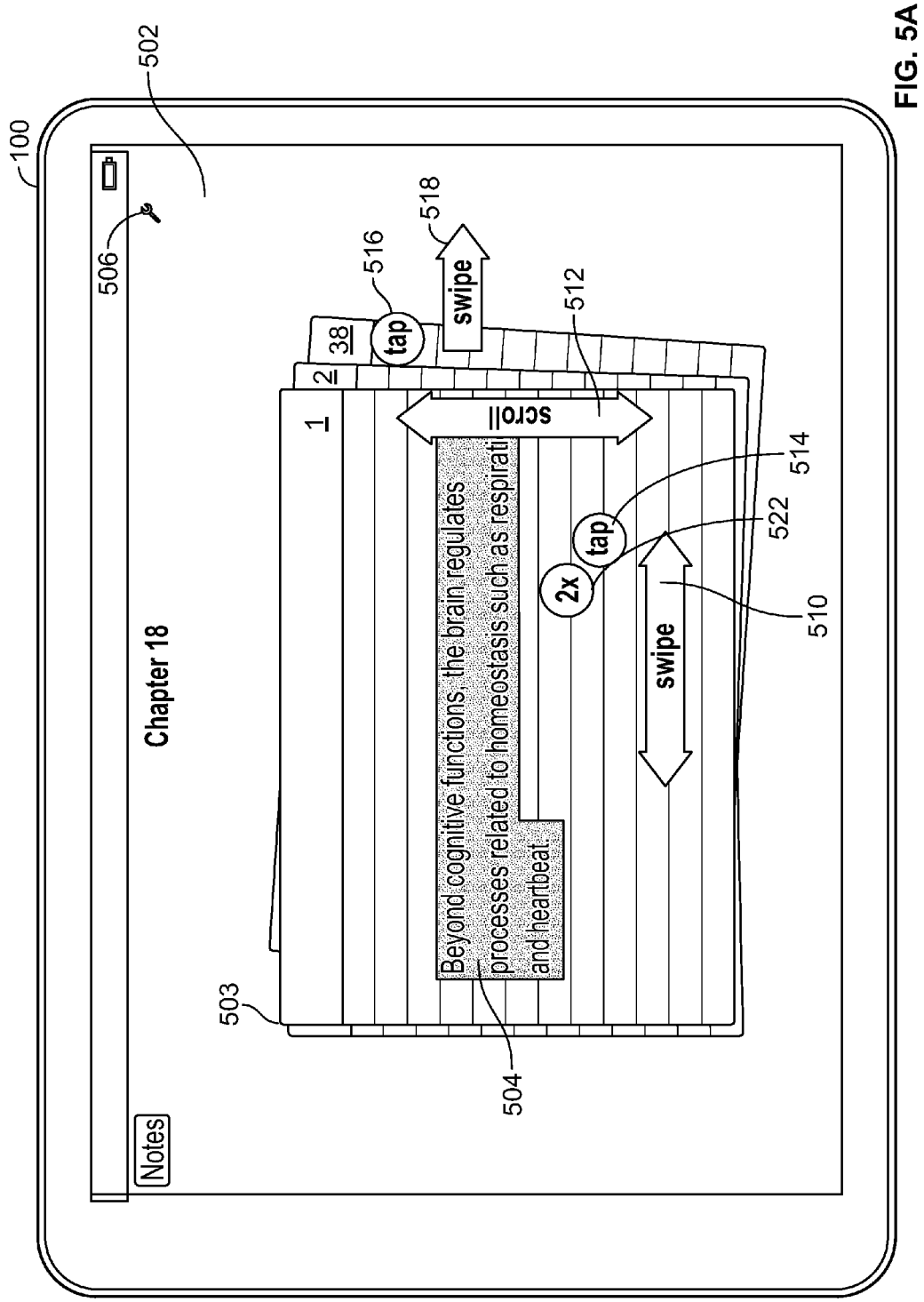
Figure 6A:
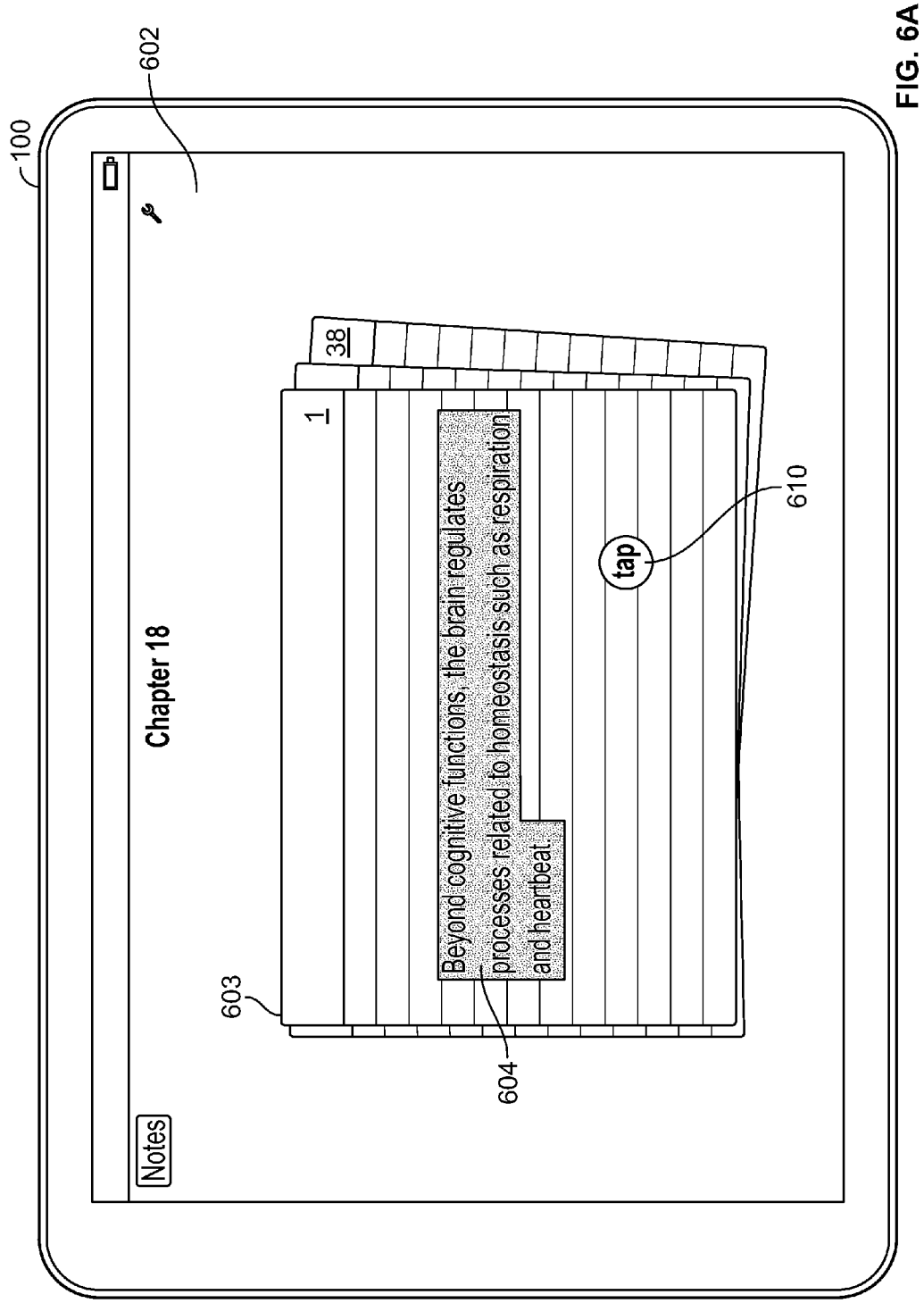
FIGS. 6A-6E illustrate exemplary graphical user interfaces for flipping a digital note card over.
Figure 6B:
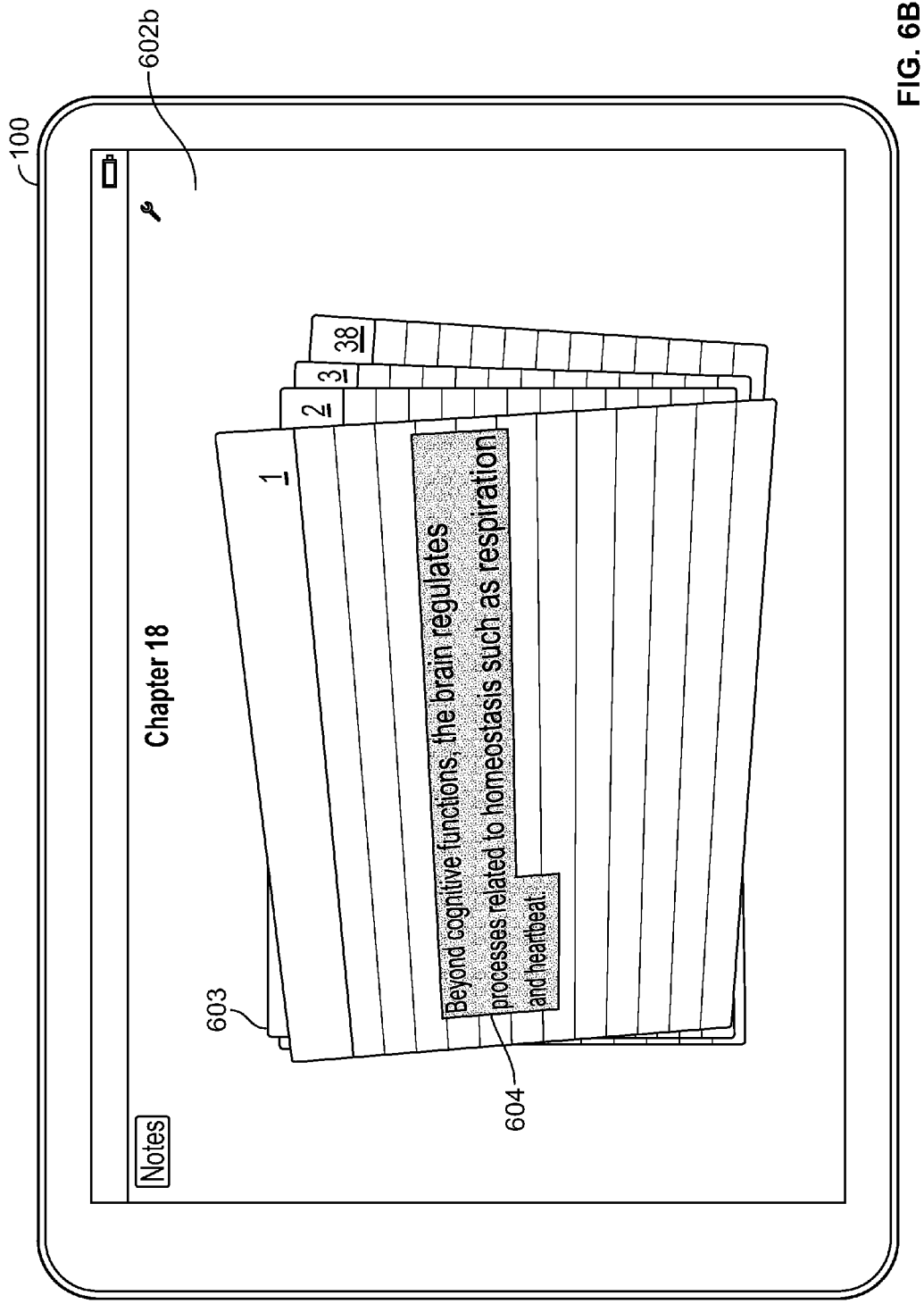
Figure 6C:
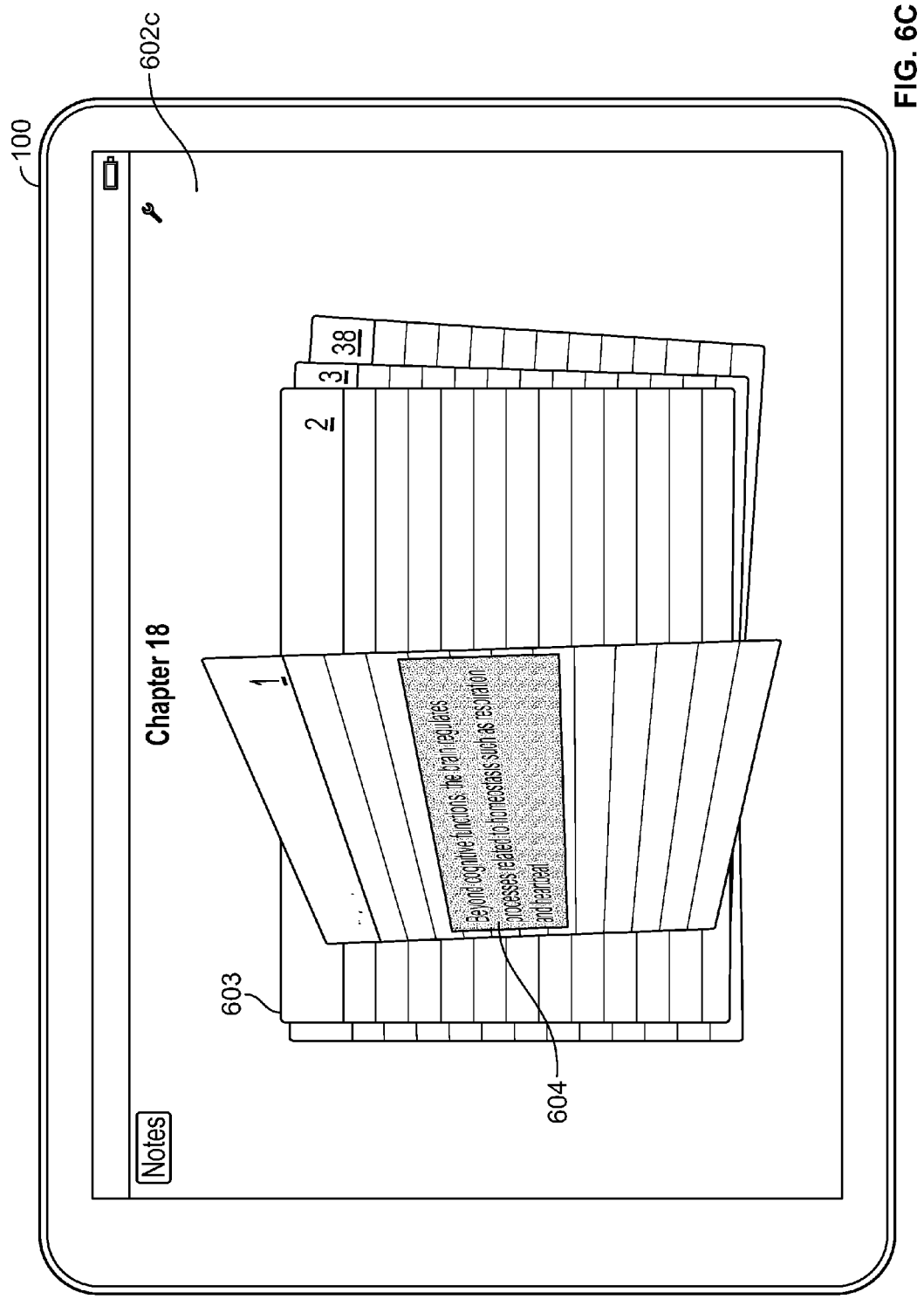
Figure 6D:
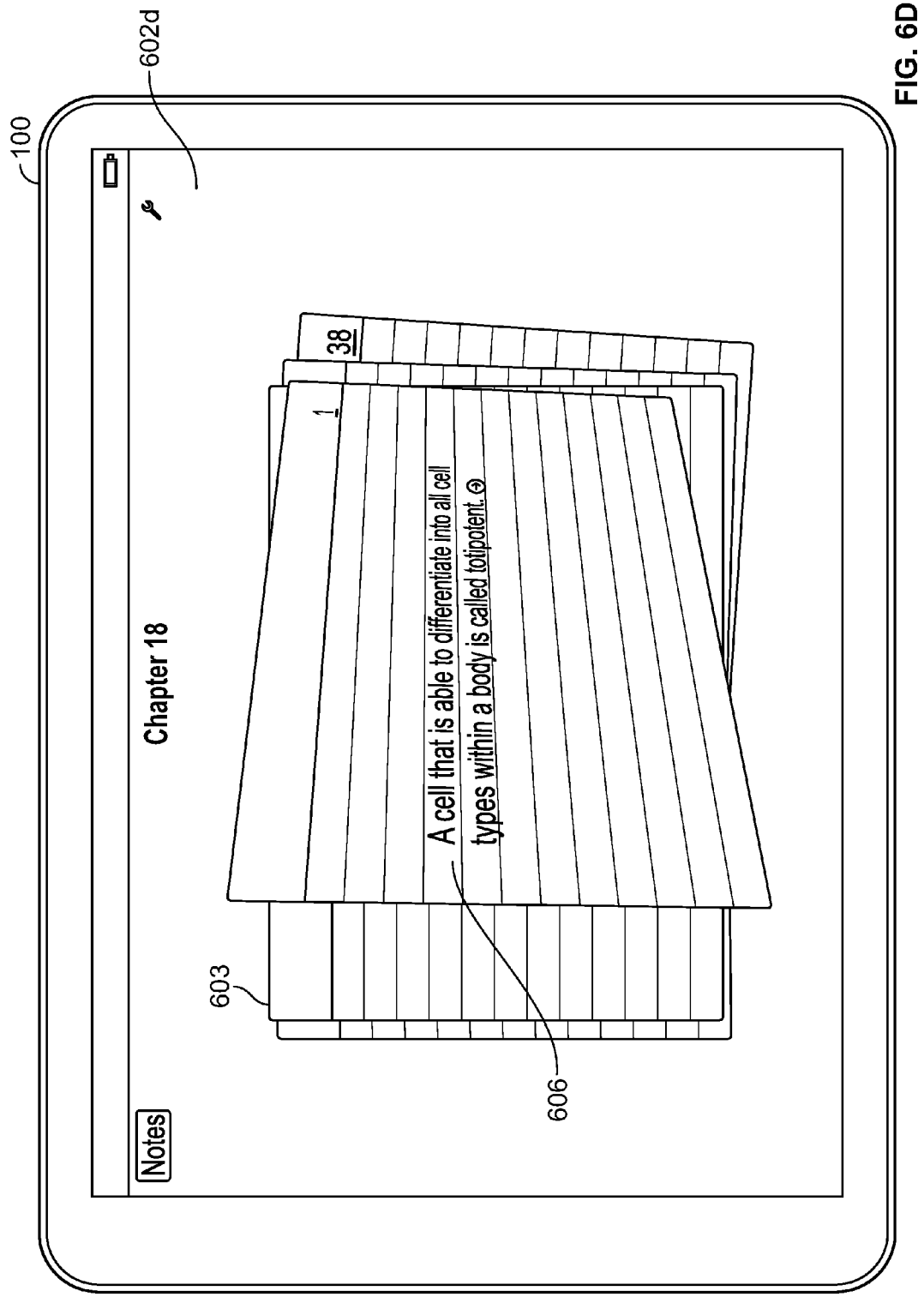
Figure 6E:
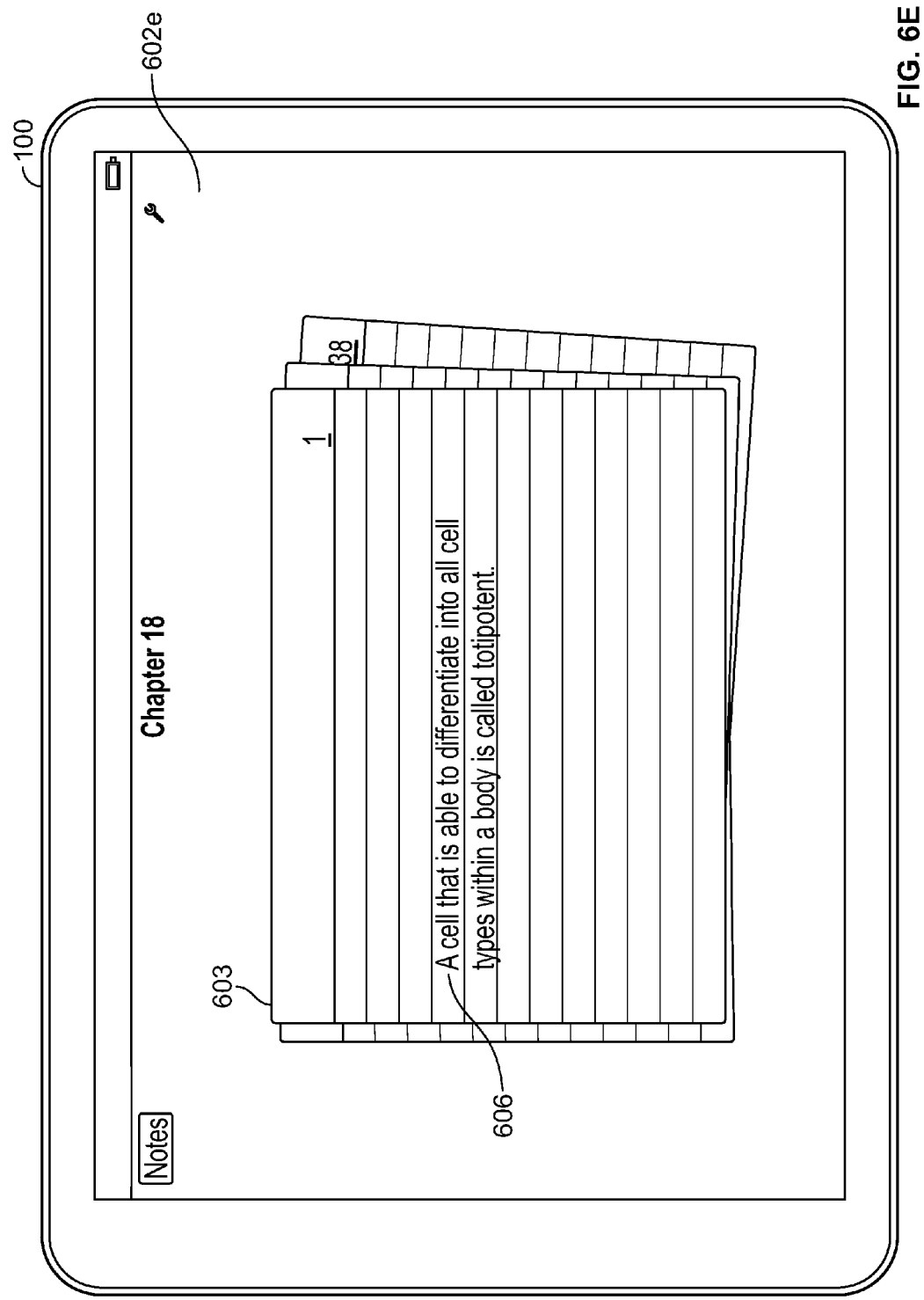

FIGS. 5A-5C illustrate exemplary graphical user interfaces for interacting with digital note cards. FIG. 5A illustrates an exemplary note card view GUI 502. GUI 502 contains note card stack 503. Note card stack 503 can include any suitable number of note cards. In some implementations, a note card included in note card stack 503 includes highlighted text and corresponding notes from a specific chapter in an ebook, and/or vocabulary words and corresponding definitions from a specific chapter of an ebook. For example, a note card in note card stack 503 can contain highlighted text on one side of the note card and a note previously attached to the highlighted text on the other side of the note card. Similarly, a note card in note card stack 503 may contain a vocabulary word on one side of the note card and a corresponding definition on the other side of the note card. Vocabulary note cards can be generated from a glossary of terms that a user of an ebook has included for the ebook, for example, as described above. In some implementations, the note portion of a note card can be edited directly on the note card while viewing the note card by invoking a note card editing feature of GUI 502.

In some implementations, a user can interact with note cards contained in note card stack 503 through graphical user interface 502. For example, GUI 502 can receive user input to flip the top note card (e.g., note card 1) in note card stack 503 over. In some implementations, a single tap received by GUI 502 on note card 1 can cause note card 1 to be flipped over, thus presenting the back, or other side, of note card 1 in GUI 502. In some implementations, upon receiving a tap input (e.g., tap input 514), note card 1 can be visually flipped over in one or more visual frames, resulting in an animation of a note card being flipped over, described in more detail below. In some implementations, if no note is associated with highlighted text 504 on the front of note card 1, note card 1 will not be flipped over in response to tap input 514. Alternatively, if no note is associated with highlighted text 504, note card 1 can still be flipped over in response to tap input 514, but the back of note card 1 may be blank.

In some implementations, a user can interact with GUI 502 to move the top note card (e.g., note card 1) in note card stack 503 to the bottom of note card stack 503. For example, a horizontal swipe input 510 on top note card 1 can cause note card 1 to be moved to the bottom of note card stack 503. In some implementations, the top notecard's position on GUI 502 changes relative to the position of a swipe input. As the top note card's position reaches a predetermined location in GUI 502, the top note card can be snapped to the bottom of the note card stack. As the top note card is snapped to the bottom of the note card stack, if the note card was flipped over, the note card can be reset such that front of the notecard is facing the top of the note card stack.

In some implementations, a portion of the last note card, or bottom note card, of note card stack 503 can be presented in GUI 502. For example, in GUI 502, a corner of bottom note card 38 can visually be shown, indicating that note card 38 is at the bottom of note card stack 503. In some implementations, bottom note card 38 can be moved to the top of note card stack 503. For example, in response to user tap 516 or swipe 518 on the visible portion of note card 38, note card 38 can be re-positioned at the top of note card stack 503.

If a note card in note card stack 503 contains more text than can visibly be shown on the note card, a vertical swipe input 512 can scroll to other portions of text not visibly shown in GUI 502. In some implementations, a double tap input 522 anywhere on the top note card in note card stack 503 can exit the note card study mode shown in GUI 502, and return the user to the notes view GUI 202 shown in FIG. 2, with the highlight corresponding to the note card on the top of stack 503 being displayed in GUI 202.

In some implementations, double tapping a note portion of the top note card in note card stack 503 (e.g., when the note card is flipped over presenting the corresponding note) can exit the note card study mode and navigate the user to my notes view, with the keyboard expanded for editing the current note. Alternatively, a virtual keyboard may be displayed in GUI 502, allowing a user to edit the note directly in the note card view.

FIG. 5B illustrates an exemplary heads-up display (HUD) 534 for customizing note card options during a note card viewing mode. In some implementations, HUD 534 can be presented in GUI 502b in response to input received selecting button 506. HUD 534 can include options for selecting which note cards to include in note card stack 503. For example, when "Highlights and Notes" option 530 is selected, highlighted text and notes corresponding to the highlighted text (if any) from the current chapter will be combined to form a note card and included in note card stack 503. Alternatively or in addition to selecting "Highlights and Notes" option 530, "Chapter Vocabulary" option 532 can be selected. If "Chapter Vocabulary" option 532 is selected, note cards with vocabulary words on the front and corresponding definitions on the back can be included in note card stack 503. In some implementations, HUD 534 can include a "Note on Front" option 540 to select whether a user's notes should be displayed on the front of a note card or on the back of a note card. For example, if "Notes on Front" option 540 is activated (e.g., turned ON), note cards in note card stack 503 can be presented with the user's notes on the front of the card, and the highlighted text corresponding to the user's notes on the back of the note card. If a note card in note card stack 503 is a vocabulary note card, activating "Notes on Front" option 540 can have the effect of displaying the definition of the vocabulary term on the front of the note card and the vocabulary term itself on the back of the note card. HUD 534 can further have an option 542 to "Shuffle" the note cards in note card stack 503. For example, when "Shuffle" option 542 is activated, the note cards in note card stack 503 can be presented in random order, but not repeat any cards until cycled through once. When "Shuffle" is deactivated, note cards in note card stack 503 can be presented in the order in which they appear in an ebook, or chapter in an ebook.

In some implementations, HUD 534 can include an option to view note cards in note card stack 503 in a live interactive way. For example, visual display device 100 can determine a subset of note cards included in note card stack 503 that a user is likely to be more interested in viewing. In some implementations, a user can dynamically remove note cards from note card stack 503, for example, if the user is familiar with the note card and no longer wants to view the note card. In addition, user feedback can be provided in graphical user interface 502b allowing a user to provide feedback indicating a level of comprehension of a note card. Visual display device 100 may then reorganize note card stack 503 based on the user feedback resulting in, for example, certain note cards in note card stack 503 being displayed more often than other note cards in note card stack 503.

FIG. 5C illustrates an exemplary HUD 534c for filtering note cards included in note card stack 503. In some implementations, note cards included in note card stack 503 can be filtered based on a highlight color of the corresponding highlighted text. For example, "Highlights and Notes" HUD 534c can present highlight filters. When a filter 560, 562, 564, 566, 568, or 570 is selected/checked, the highlights and notes of the corresponding highlight color/style will be included in note card stack 503. When a filter 560, 562, 565, 566, 568, or 570 is not selected/checked, the note cards of the corresponding highlight color can be removed from note card stack 503.

FIGS. 6A-6E illustrate exemplary GUIs for visually presenting a note card being flipped over. In some implementations, the back of note card 1 can be presented in response to user input. For example, tap input 610 received in GUI 602 can initiate a visualization of note card 1 flipping over resulting in the back of note card 1 being displayed in GUI 602 on the top of note card stack 603. The back of note card 1 and note 606 corresponding to highlighted text 604 is shown in GUIs 602d and 602e of FIGS. 6D and 6E, respectively. In some implementations, in response to receiving tap input 610, note card 1 is visually flipped over in a series of GUIs 602b, 602c, 602d, and 602e. In some implementations, GUIs 602b, 602c, 602d, and 602e can be combined with intermediate GUIs to create a virtually seamless animation showing note card 1 flipping over. In other implementations, the back of note card 1 can be presented in GUI 602 without an animation, or series of GUIs.

Figure 7A:
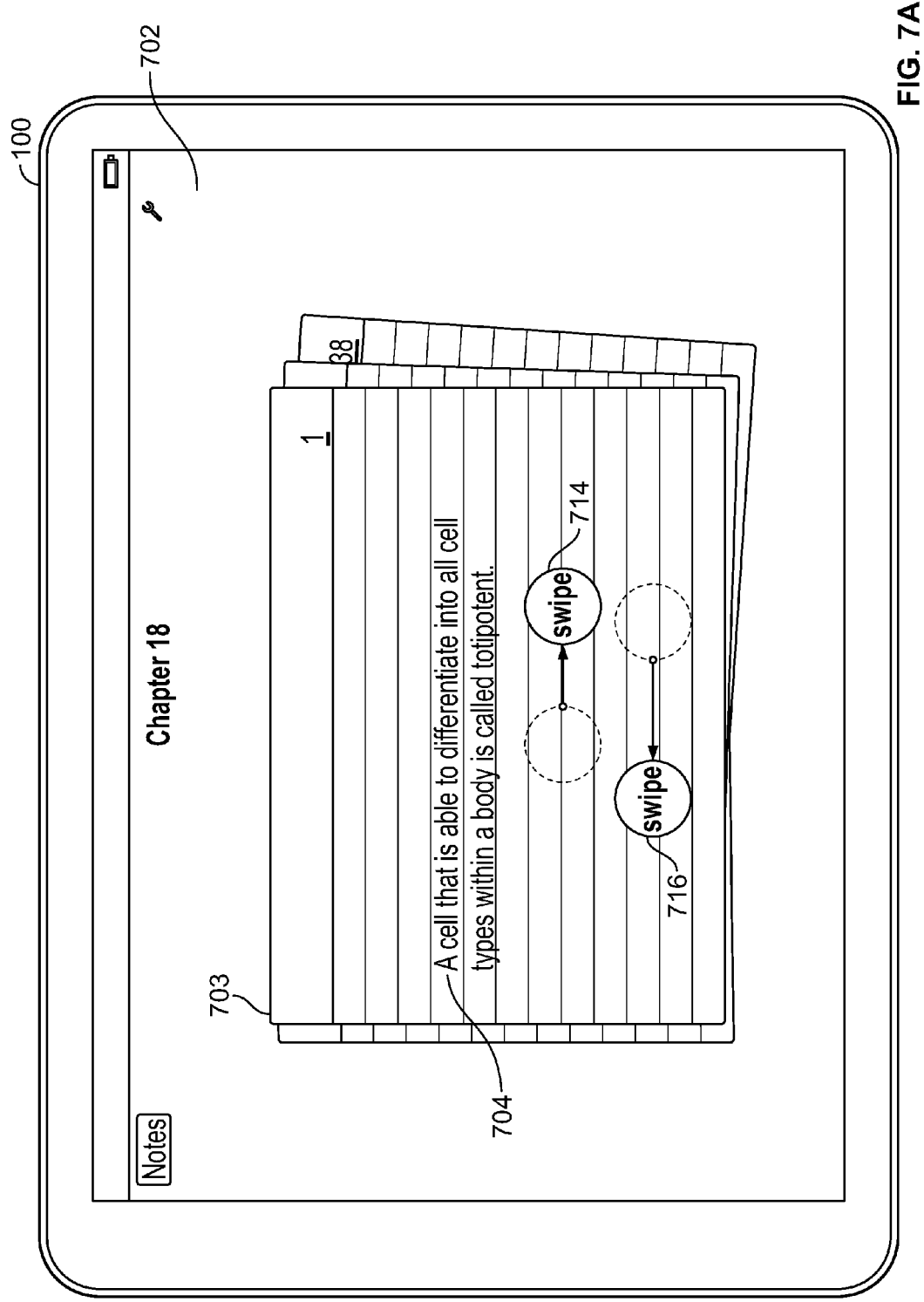
FIGS. 7A-7F illustrate exemplary graphical user interfaces for moving a digital note card to the back of a digital note card stack.
Figure 7B:
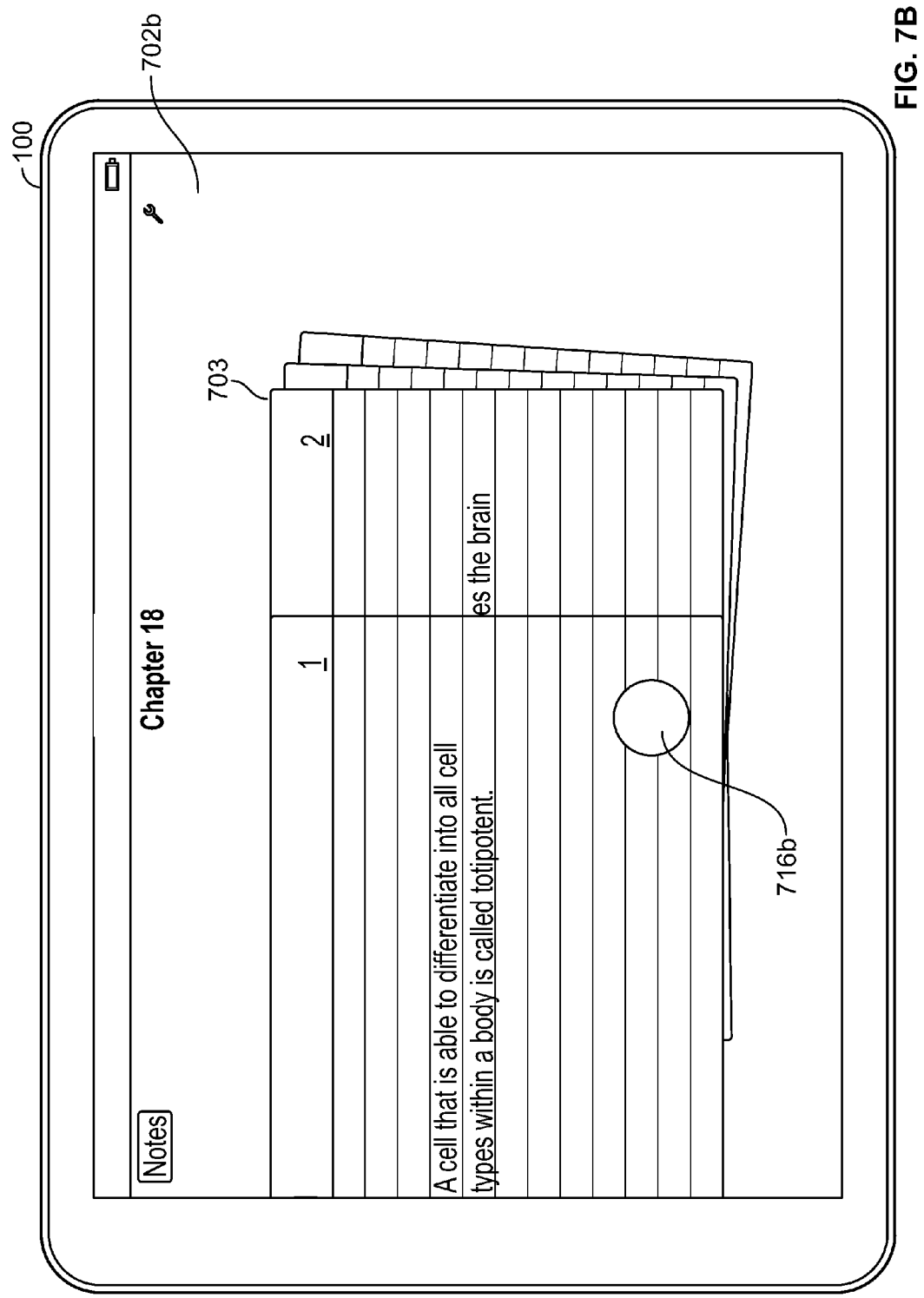
Figure 7C:
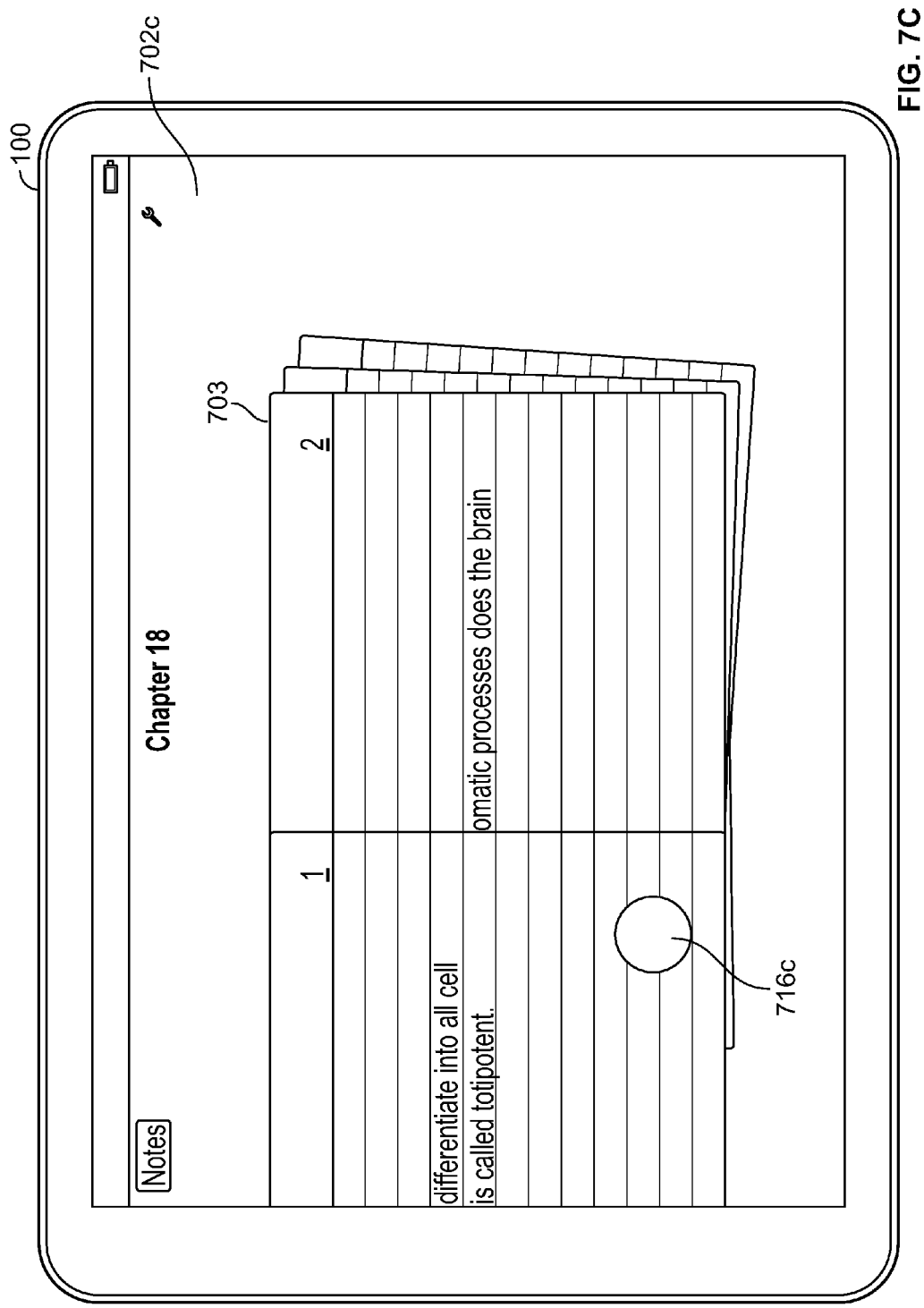
Figure 7D:
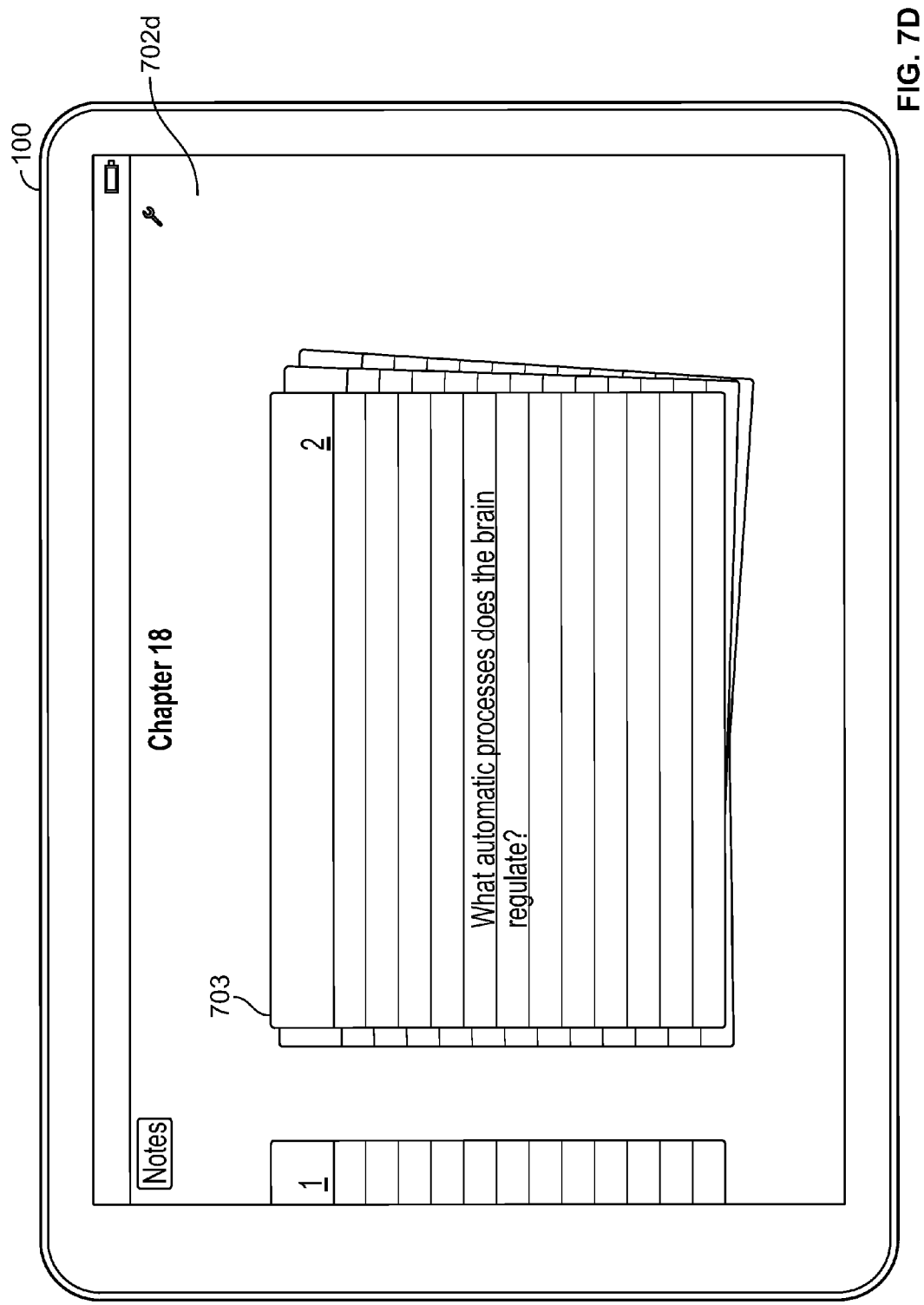
Figure 7E:
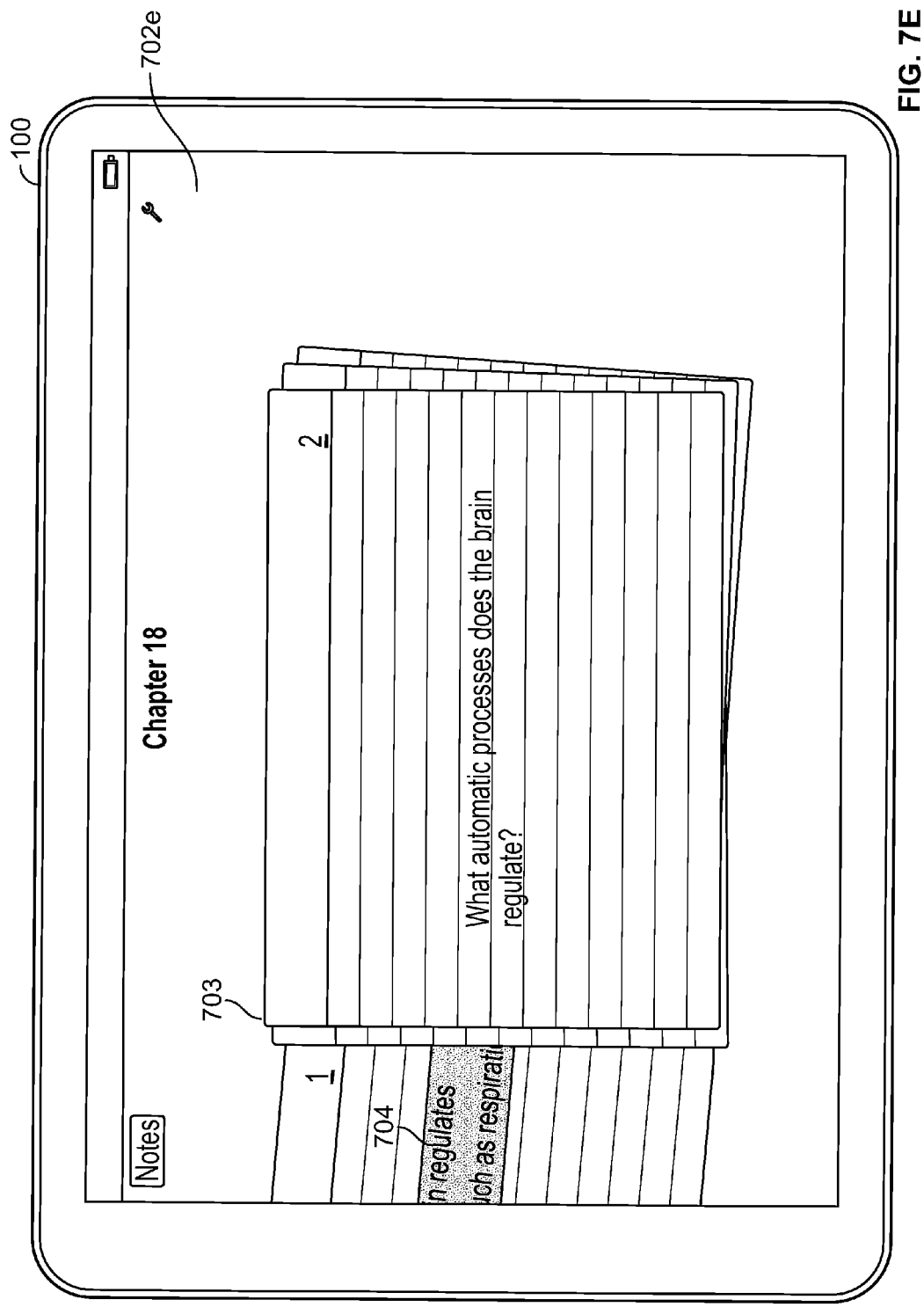
Figure 7F:
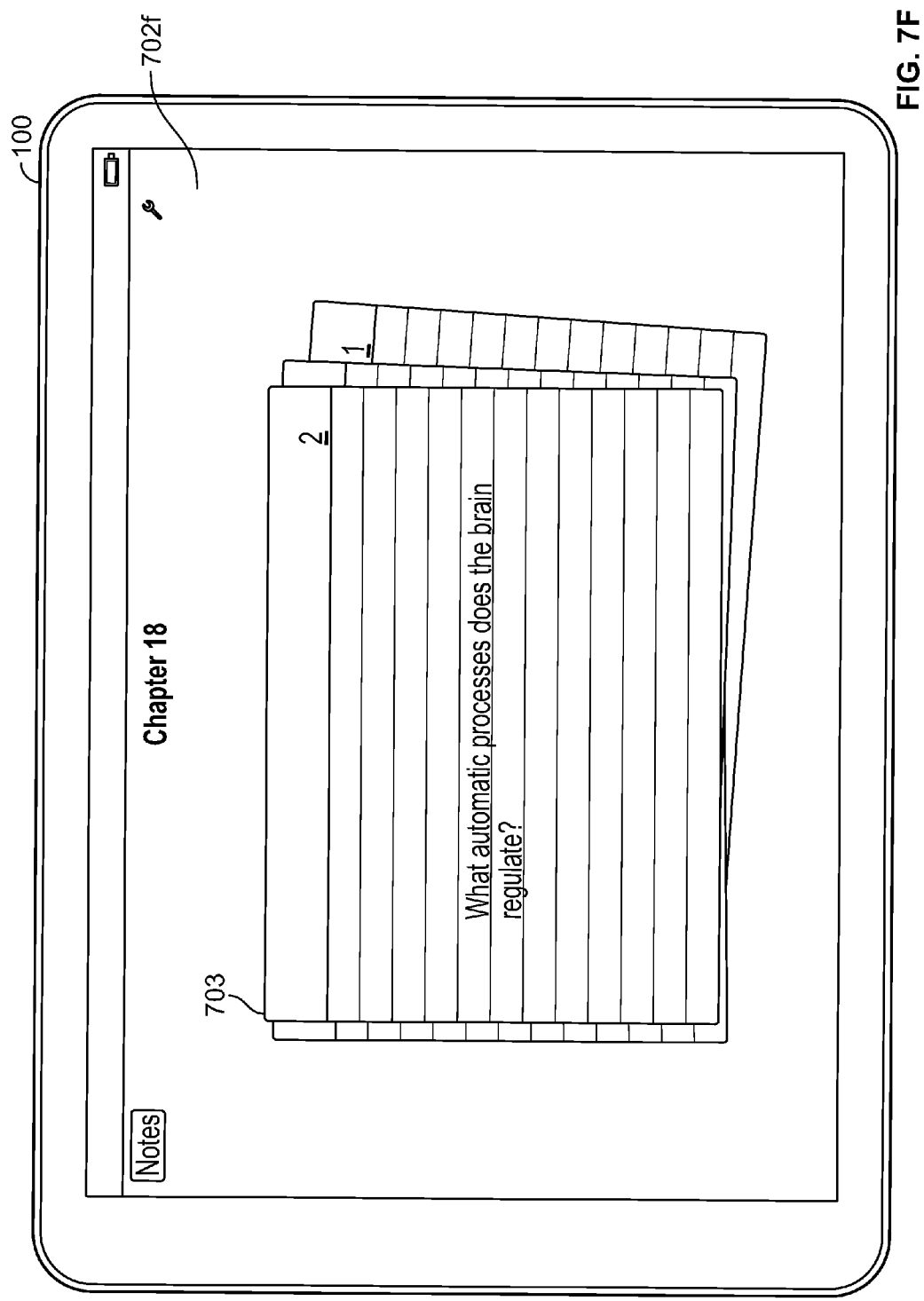

FIGS. 7A-7F illustrate exemplary graphical user interfaces for moving a digital note card to the bottom of a digital note card stack. In some implementations, in response to a horizontal swipe 714 or 716 on note card 1, the next note card, note card 2, in note card stack 703 can be displayed on the top of note card stack 703. In some implementations, the position of top note card 1 visually tracks, follows, or moves with an input position on GUI 702 as the input position changes (e.g., during a swipe input). FIG. 7B and FIG. 7C illustrate note card 1 being swiped off of GUI 702a-702c in response to a user swipe input 716a-716c. When transitioning between note cards, the top note card tracks user input until the top note card reaches a predetermined position in a GUI, as shown in GUI 702d in FIG. 7D. When the predetermined position is reached, the top note card is then moved or snapped to the bottom of note card stack 703. In some implementations, the front of note card 1 can be restored as note card 1 is moved to the bottom of note card stack 703. For example, as note card 1 passes the boundary of GUI 702d, note card 1 can be returned to the bottom of the note card stack 703 with the front of note card 1 facing the top of note card stack 703, as shown by highlighted text 704 on the front of note card 1 in GUI 702e, as opposed to the back of note card 1 facing the top of note card stack 703, as it did when note card 1 exited GUI 702d. In FIG. 7f, note card 1 has been moved to the bottom of note card stack 703 and note card 2 is now the top card of note card stack 703. In some implementations, GUIs 702, 702b, 702c, 702d, 702e, and 702f can be combined with intermediate GUIs to create a virtually seamless animation showing note card 1 being moved to the back of note card stack 703.

Figure 8A:
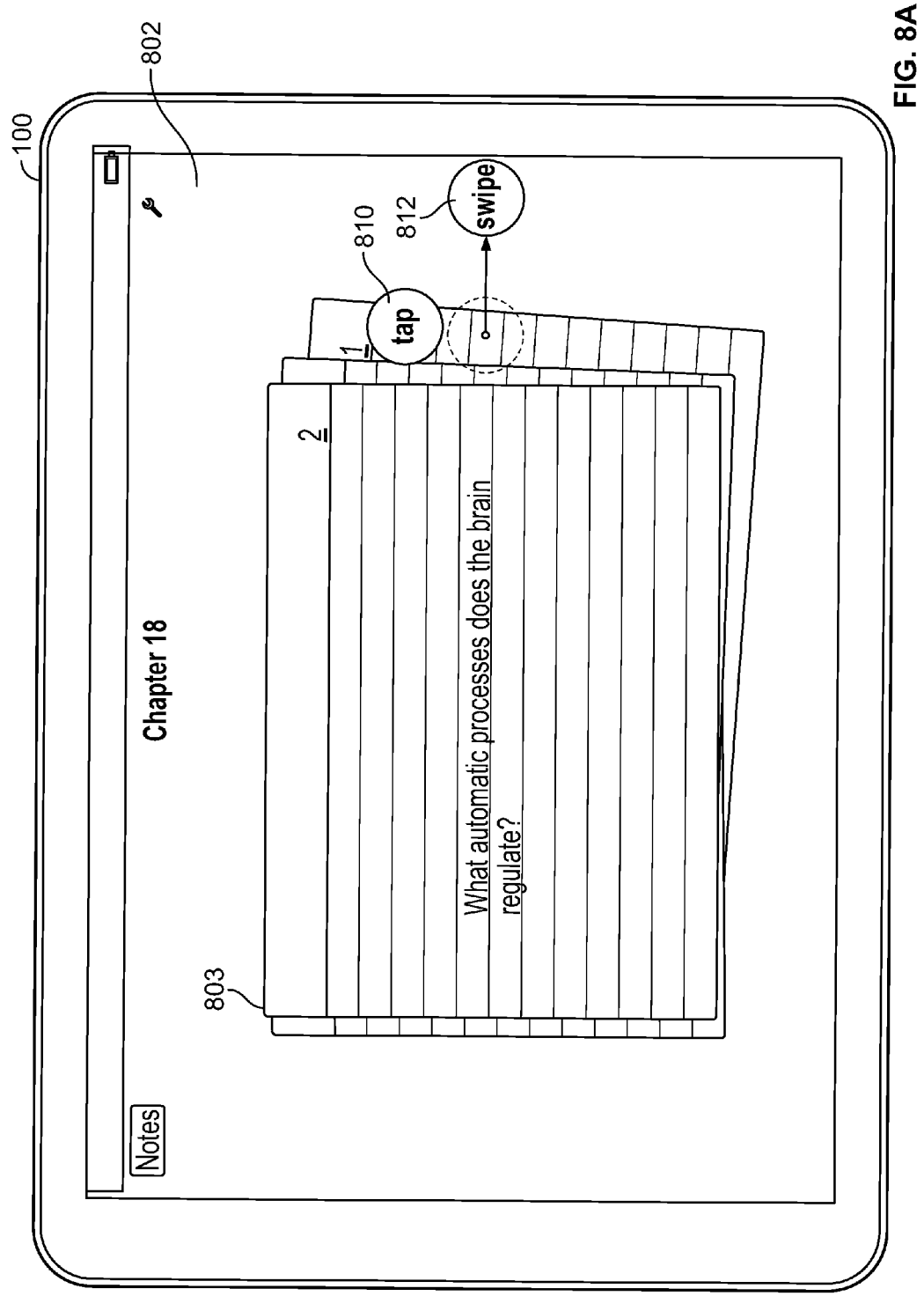
Figure 8B:
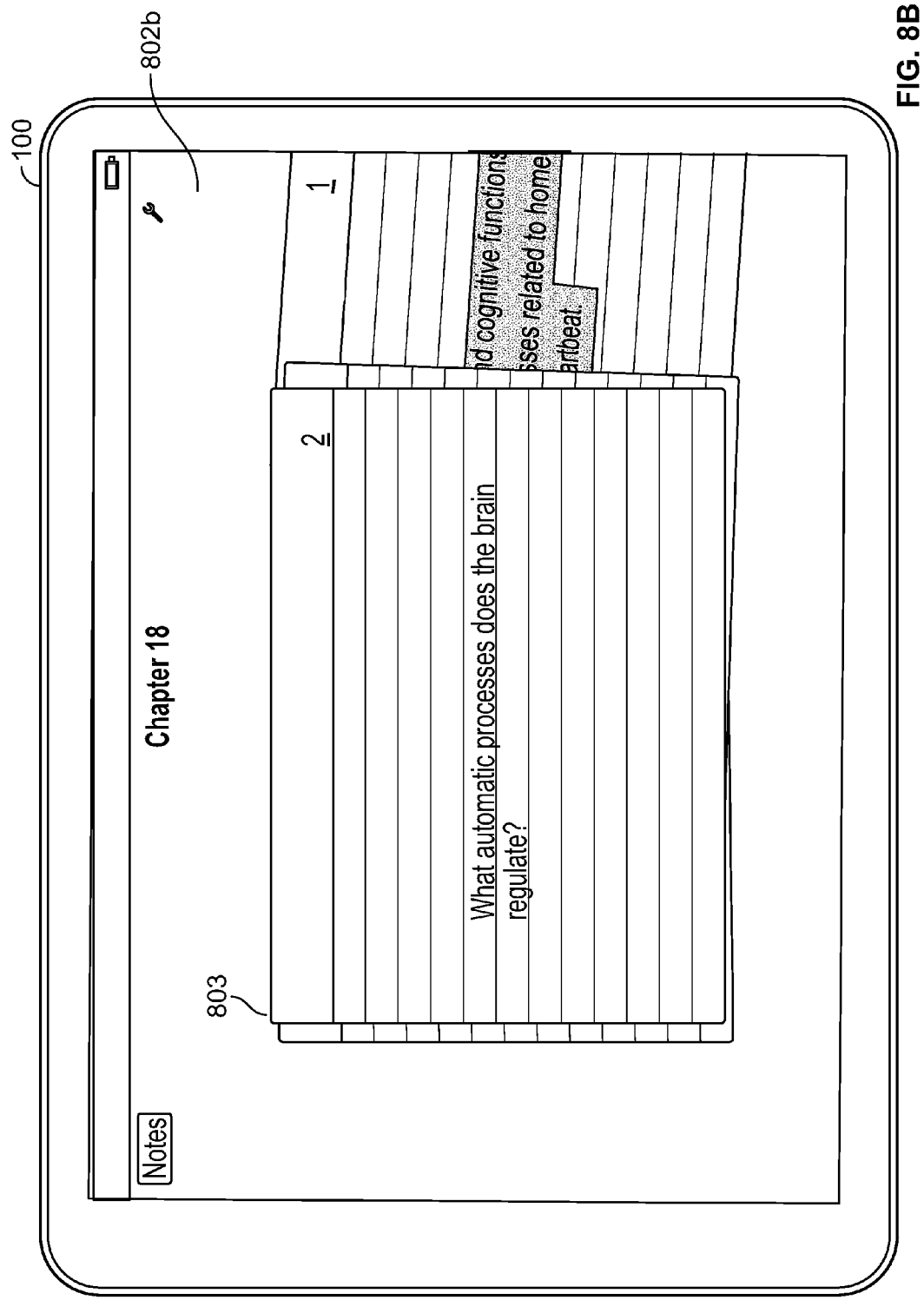
Figure 8E:
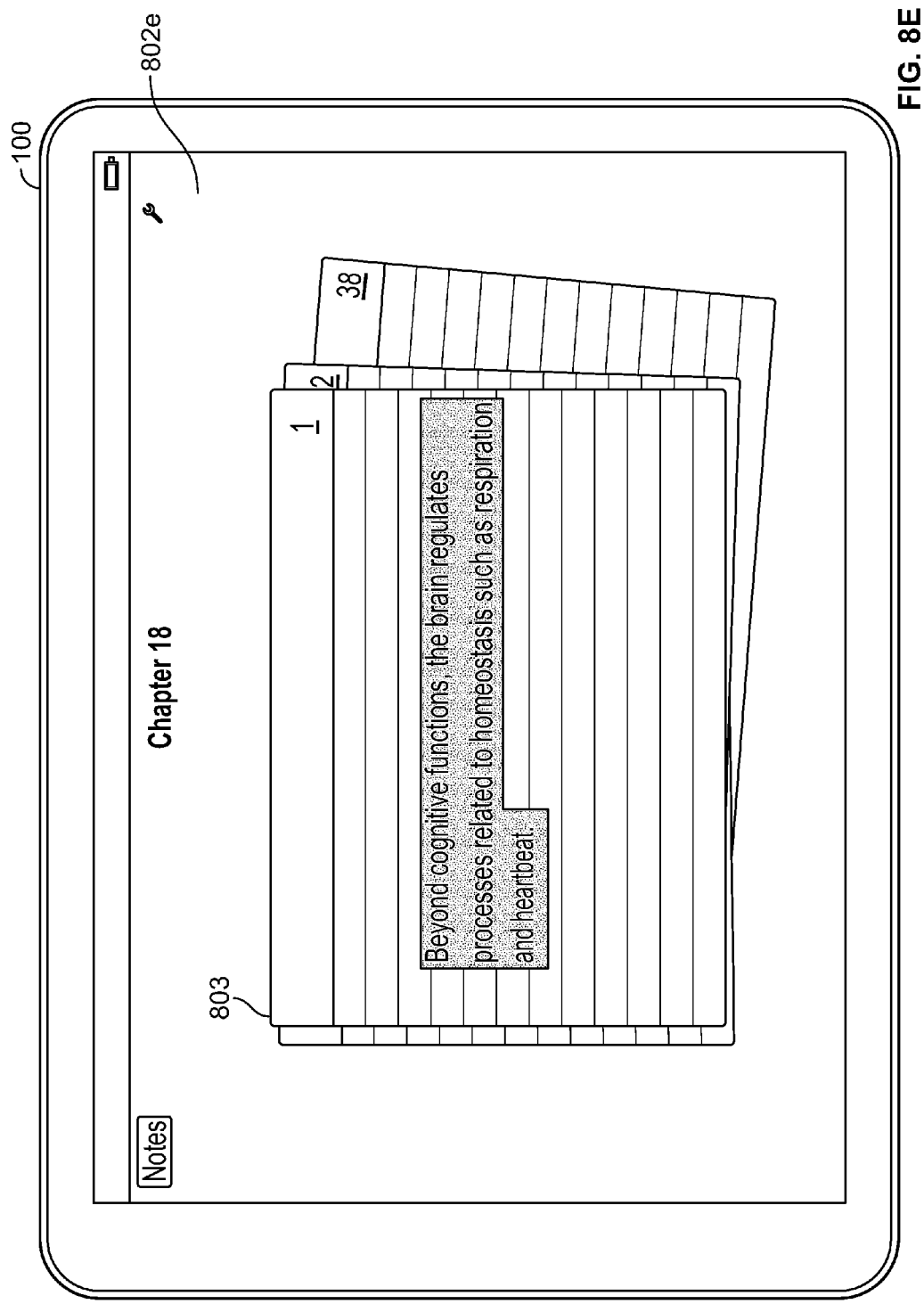

FIGS. 8A-8E illustrate exemplary graphical user interfaces for moving a digital note card to the front of a digital note card stack. In some implementations, tapping input 810 or swiping input 812 on bottom note card 1 can move note card 1 to the front of note card stack 803. For example, upon receiving user input to move note card 1 to the front of note card stack 803, bottom note card 1 may visually transition from the bottom of note card stack 803 to the front of note card stack 803. GUIs 802b-802e presented in FIGS. 8B-8E illustrate the visual transition of bottom note card 1 to the front of note card stack 803. In FIG. 8E, bottom note card 1 has been restored to the front of note card stack 803, on top of note card 2, and the new bottom note card is the previous bottom note card in note card stack 803, e.g., note card 38. In some implementations, GUIs 802, 802b, 802c, 802d, and 802e can be combined with intermediate GUIs to create a virtually seamless animation showing note card 1 being moved to the front of note card stack 803.

Figure 9:
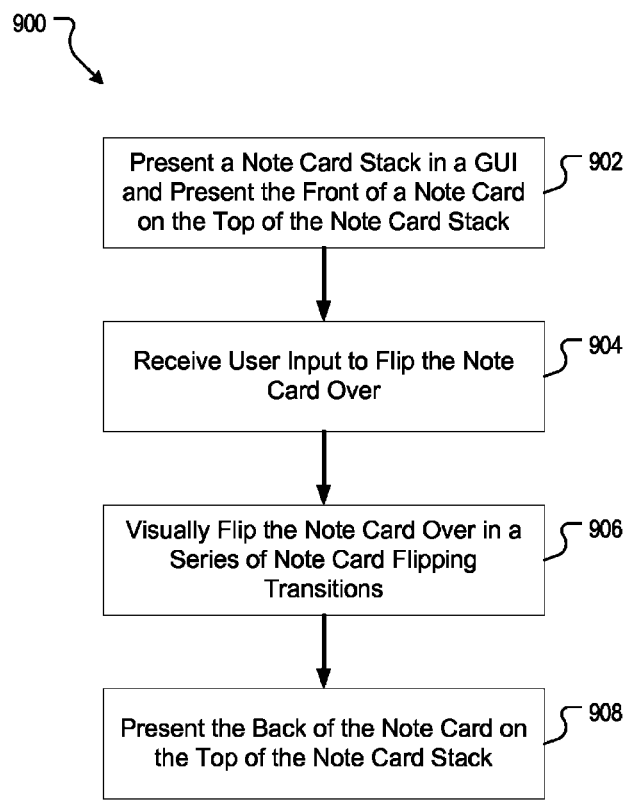
FIG. 9 shows an example process for flipping a digital note card over.

FIG. 9 shows an example process 900 for flipping a digital note card over. At 902, a note card stack is presented in a graphical user interface. Additionally, the front of a note card on the top of the note card stack is also presented. User input requesting to flip the top note card over so that the back can be viewed is received at 904. In response to the user input received at 904, the top note card is visually flipped over, using any suitable number of intermediate graphical transitions. At 908, the back of the top note card is presented in the graphical user interface.

Figure 10:
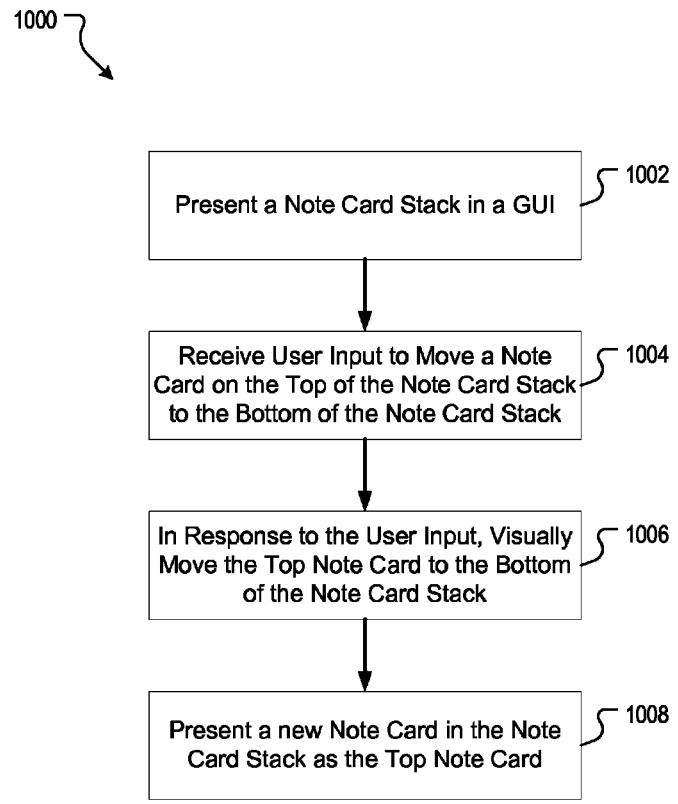
FIG. 10 shows an example process for moving a digital note card to the bottom of a digital note card stack.

FIG. 10 shows an example process 1000 for moving a digital note card to the bottom of a digital note card stack. At 1002, a note card stack is presented in a graphical user interface. At 1004, user input moving the top note card of the note card stack to the bottom of the note card stack is received. At 1006, in response to the received user input, the top note card is visually moved to the bottom of the note card stack. At 1008, a new note card is presented on the top of the note card stack, and the old top note card is visually shown at the bottom of the note card stack.

Figure 11:
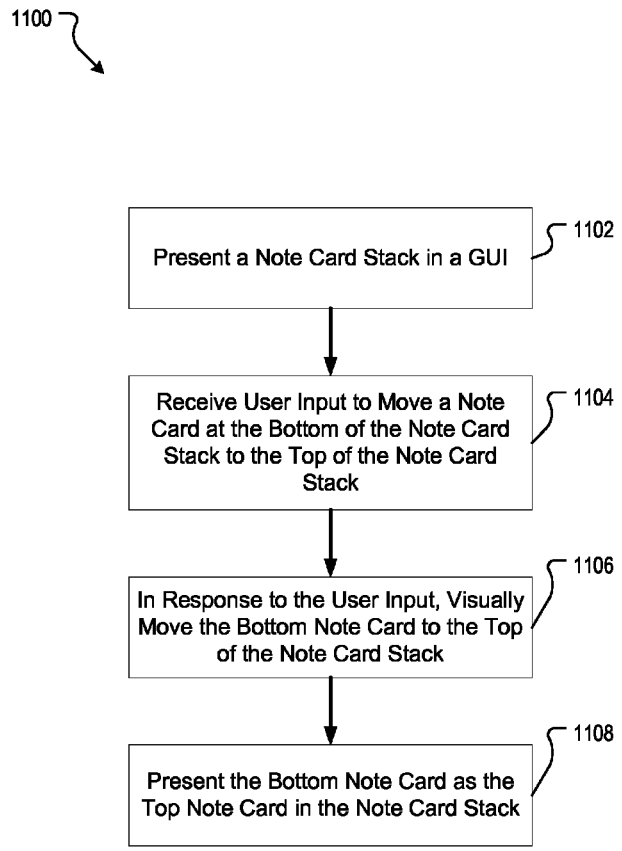
FIG. 11 shows an example process for moving a digital note card to the top of a digital note card stack.

FIG. 11 shows an example process 1100 for moving a digital note card to the top of a digital note card stack. At 1102, a note card stack is presented in a graphical user interface. At 1104, user input moving the bottom note card of the note card stack to the top of the note card stack is received. At 1106, in response to the received user input, the bottom note card is visually moved to the top of the note card stack. At 1108, the bottom note card is now presented in the graphical user interface as the top note card of the note card stack.

Example Device Architecture

Figure 12:
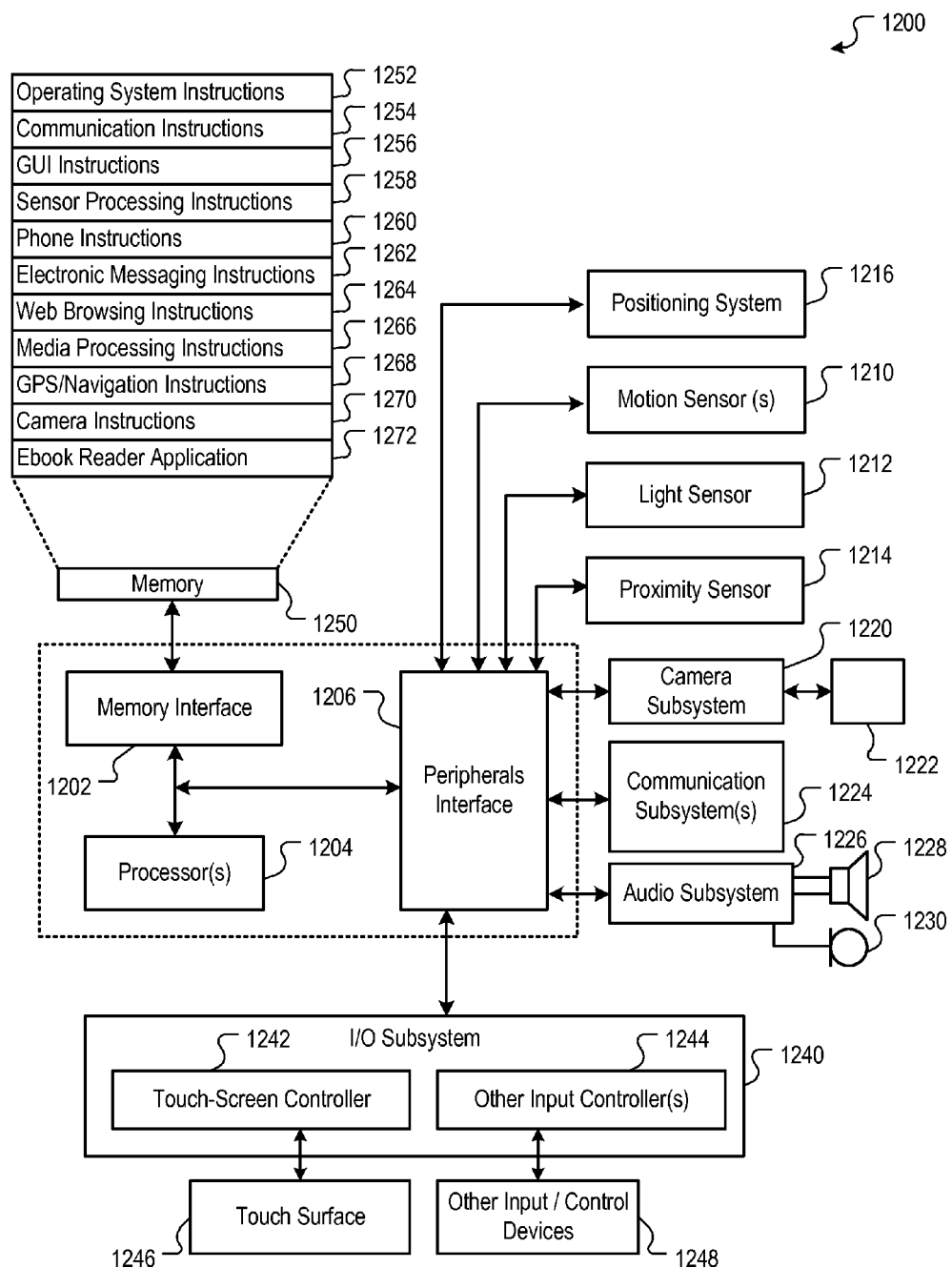
FIG. 12 is a block diagram of an example architecture for a device capable of running an application for creating and interacting with digital note cards

FIG. 12 is a block diagram of an exemplary architecture 1200 for a device capable of running an application for creating and viewing digital note cards. Architecture 1200 can include memory interface 1202, data processors, image processors and/or central processing units 1204 and peripherals interface 1206. Memory interface 1202, processors 1204 and/or peripherals interface 1206 can be separate components or can be integrated in one or more integrated circuits. The various components in the device can be coupled by one or more communication buses or signal lines.

Sensors, devices, and subsystems can be coupled to peripherals interface 1206 to facilitate multiple functionalities. For example, positioning system 1216, motion sensor 1210, light sensor 1212, and proximity sensor 1214 can be coupled to the peripherals interface 1206 to facilitate various positioning, orientation, lighting, and proximity functions. For example, in some implementations, light sensor 1212 can be utilized to facilitate adjusting the brightness of touch screen 1246. In some implementations, motion sensor 1211 (e.g., an accelerometer, velicometer, or gyroscope) can be utilized to detect movement of the device. Accordingly, display objects and/or media can be presented according to a detected orientation, e.g., portrait or landscape.

Other sensors can also be connected to peripherals interface 1206, such as a temperature sensor, a biometric sensor, a gyroscope, or other sensing device, to facilitate related functionalities.

Location determination functionality can be facilitated through positioning information from positioning system 1216. Positioning system 1219, in various implementations, can be a component internal to the device, or can be an external component coupled to the device (e.g., using a wired connection or a wireless connection). In some implementations, positioning system 1216 can include a Global Navigation Satellite System (GNSS) receiver or chipset, such as a Global Positioning System (GPS) receiver or chipset, and a positioning engine (e.g., including a Kalman filter) operable to derive positioning information from received GPS satellite signals. In other implementations, positioning system 1216 can include a magnetometer to provide direction indications (e.g., magnetic or true North). In still further implementations, positioning system 1216 can use wireless signals (e.g., cellular signals or 3G, WiFi or IEEE 802.11 signals) to determine location information associated with the device. Hybrid positioning can also be used. Other positioning systems are possible.

Camera subsystem 1220 and optical sensor 1222, e.g., a charged coupled device (CCD) or a complementary metal-oxide semiconductor (CMOS) optical sensor, can be utilized to facilitate camera functions, such as capturing photographs and video clips.

Communication functions can be facilitated through one or more communication subsystems 1224. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1224 can depend on the communication network(s) or medium(s) over which the device is intended to operate. For example, the device may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1224 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1226 can be coupled to speaker 1228 and one or more microphones 1230. One or more microphones 1230 can be used, for example, to facilitate voice-enabled functions, such as voice recognition, voice replication, digital recording, and telephony functions.

I/O subsystem 1240 can include touch screen controller 1242 and/or other input controller(s) 1244. Touch-screen controller 1242 can be coupled to a touch surface 1246. Touch surface 1246 and touch screen controller 1242 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1246 or proximity to touch surface 1246.

Other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of speaker 1228 and/or microphone 1230. A user of the device may customize a functionality of one or more of the buttons. Touch surface 1246 can be used to implement virtual or soft buttons and/or a keyboard.

In some implementations, the device can present recorded audio and/or video files, such as MP3, AAC, and MPEG files. In some implementations, the device can include the functionality of an MP3 player, such as an iPhone™.

Memory interface 1202 can be coupled to memory 1250. Memory 1250 can include high-speed random access memory and/or non-volatile memory, such as one or more magnetic disk storage devices, one or more optical storage devices, and/or flash memory (e.g., NAND, NOR). Memory 1250 can store operating system 1252, such as Darwin, RTXC, LINUX, UNIX, OS X, WINDOWS, or an embedded operating system such as VxWorks. Operating system 1252 may include instructions for handling basic system services and for performing hardware dependent tasks. In some implementations, the operating system 1252 can be a kernel (e.g., UNIX kernel).

Memory 1250 may also store communication instructions 1254 to facilitate communicating with one or more additional devices, one or more computers and/or servers. Communication instructions 1254 can also be used to select an operational mode or communication medium for use by the device, based on a geographic location (obtained by GPS/Navigation instructions 1268) of the device. Memory 1250 may include graphical user interface instructions 1256 to facilitate graphic user interface processing, such as described in reference to FIGS. 1-11; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1268 to facilitate GPS and navigation-related processes and instructions, e.g., mapping a target location; camera instructions 1270 to facilitate camera-related processes and functions; and instructions 1272 for an ebook reader application for reading ebooks and for creating and interacting with note cards, as described in reference to FIGS. 1-11. Memory 1250 may also store other software instructions (not shown), such as Web video instructions to facilitate web video-related processes and functions; and/or Web shopping instructions to facilitate web shopping-related processes and functions. In some implementations, media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1250 can include additional instructions or fewer instructions. Furthermore, various functions of the device may be implemented in hardware and/or in software, including in one or more signal processing and/or application specific integrated circuits.

Network-Operating Environment for a Device

Figure 13:
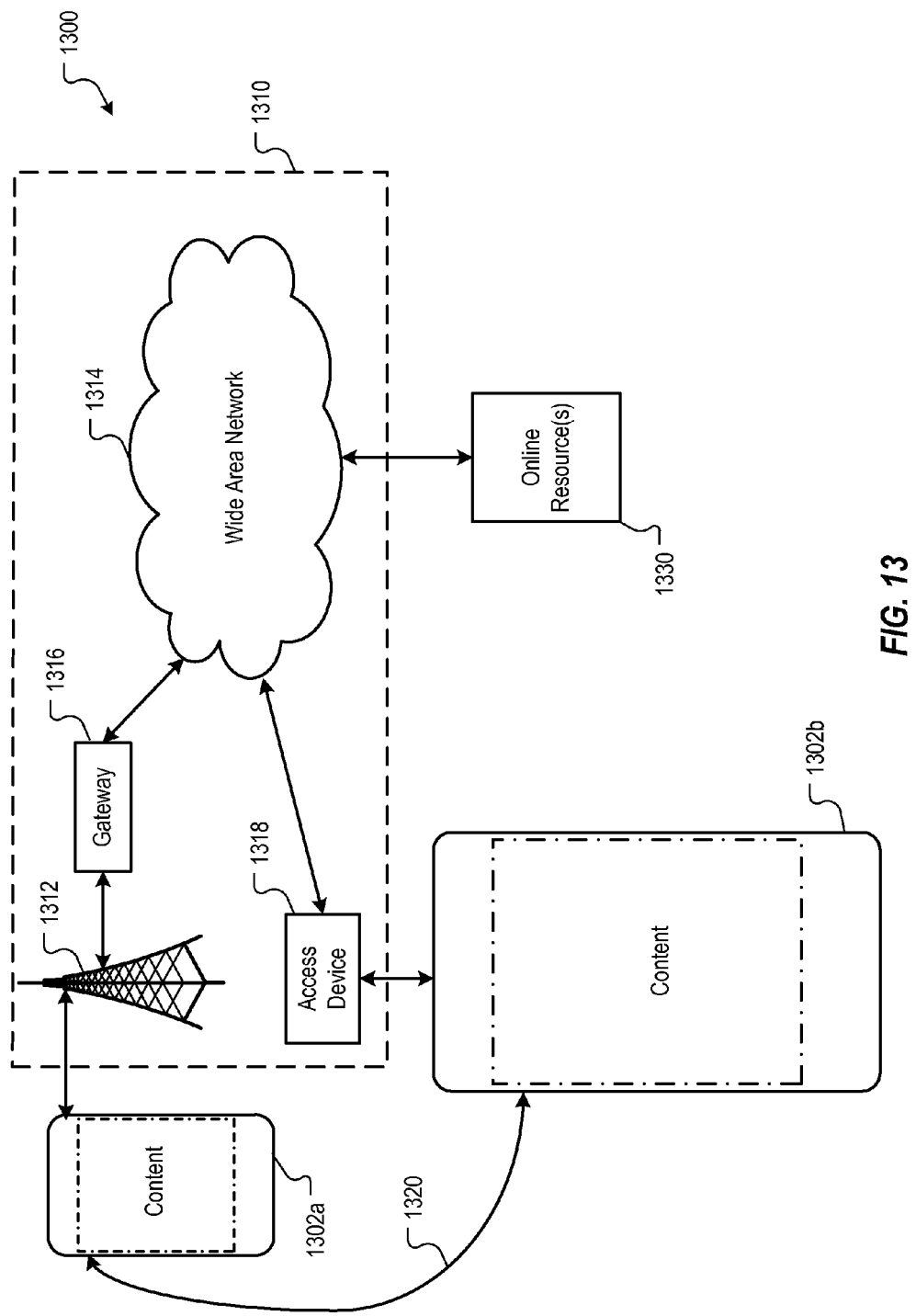
FIG. 13 is a block diagram of an example network-operating environment for the device of FIG. 12.

FIG. 13 is a block diagram of an example network-operating environment 1300 for the device of FIG. 12. Devices 1302a and 1302b can communicate data over one or more wired and/or wireless networks 1310. For example, wireless network 1312, e.g., a cellular network, can communicate with wide area network (WAN) 1314, such as the Internet, by use of gateway 1316. Likewise, access device 1318 (access point or AP)), such as an 802.11g wireless access device, can provide communication access to the wide area network 1314. In some implementations, both voice and data communications can be established over wireless network 1312 and access device 1318. For example, device 1302a can place and receive phone calls (e.g., using VoIP protocols), send and receive e-mail messages (e.g., using POP3 protocol), and retrieve electronic documents and/or streams, such as web pages, photographs, and videos, over wireless network 1312, gateway 1316, and wide area network 1314 (e.g., using TCP/IP or UDP protocols). Likewise, in some implementations, device 1302b can place and receive phone calls, send and receive e-mail messages, and retrieve electronic documents over access device 1318 and wide area network 1314. In some implementations, devices 1302a or 1302b can be physically connected to access device 1318 using one or more cables and the access device 1318 can be a personal computer. In this configuration, device 1302a or 1302b can be referred to as a "tethered" device.

Devices 1302a and 1302b can also establish communications by other means. For example, wireless device 1302a can communicate with other wireless devices, e.g., other devices 1302a or 1302b, cell phones, etc., over wireless network 1312. Likewise, devices 1302a and 1302b can establish peer-to-peer communications 1320, e.g., a personal area network, by use of one or more communication subsystems, such as a Bluetooth™ communication device. Other communication protocols and topologies can also be implemented.

Devices 1302a or 1302b can communicate with one or more services over one or more wired and/or wireless networks 1310. These services can include, for example, online resources 1330, such as an online store for accessing, purchasing, and/or downloading digital books to the devices 1302a and/or 1302b. Online resources 1330 can also include a Web-based ebook reader application that can be used by subscribing users through a browser.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, many of the examples presented in this document were presented in the context of an ebook. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
displaying, by a processing device, content from an electronic book in a graphical user interface presented on an electronic display coupled to the processing device;
receiving first user input selecting a portion of the content;
based on receiving the first user input, determining whether the selected portion of the content exceeds a predetermined number of characters, wherein a first set of options for performing operations on the selected portion of the content is displayed if the selected portion of the content is less than the predetermined number of characters and a second set of options for performing operations on the selected portion of the content that includes an option for creating a digital note card is displayed if the selected portion of the content equals or exceeds the predetermined number of characters;
in response to determining that the selected portion of the content equals or exceeds the predetermined number of characters, displaying the second set of options for performing operations on the selected portion of the content;
receiving second user input selecting the option for creating a digital note card;
based on receiving the second user input, displaying an input field for adding a user-generated note to a digital note card; and
creating a first digital note card, where a first side of the first digital note card includes the selected portion of the content, and a second side of the first digital note card includes the user-generated note.

2. The method of claim 1, comprising:
displaying, in the graphical user interface, the first digital note card in a stack of digital note cards, where the first side of the first digital note card including the selected portion of the content is displayed on the top of the stack.

3. The method of claim 2, comprising:
receiving a user input requesting to flip the first digital note card over;
responsive to the received user input, visually flipping the first digital note card over in an animated sequence including a series of graphical transitions; and
displaying, in the graphical user interface, the second side of the first digital note card that includes the user-generated note.

4. The method of claim 2, comprising:
receiving a user input requesting to move the first digital note card to the bottom of the stack of digital note cards, the user input including repositioning the first digital note card in the graphical user interface;
responsive to the received user input, determining whether a position of the first digital note card reaches a predetermined location in the graphical user interface;
based on determining that the position of the first digital note card has reached the predetermined location in the graphical user interface, visually moving the first digital note card to the bottom of the stack in an animated sequence; and
displaying, in the graphical user interface, a front of a second digital note card on the top of the stack, and displaying at least a portion of the first digital note card at the bottom of the stack.

5. The method of claim 2, comprising:
receiving a user input requesting to move a second digital note card that is at the bottom of the stack of digital note cards to the top of the stack;
responsive to the received user input, visually moving the second digital note card to the top of the stack in an animated sequence including a series of graphical transitions; and
displaying, in the graphical user interface, a front of the second digital note card on the top of the stack, and displaying at least a portion of the first digital note card below the second digital note card.

6. The method of claim 2, comprising:
receiving user feedback indicating a level of comprehension of content included in a digital note card; and
based on the user feedback, dynamically filtering the digital note cards included in the stack of digital note cards, wherein a subset of digital note cards in the dynamically filtered stack are displayed more often compared to other digital note cards in the stack.

7. The method of claim 2, comprising:
filtering the digital note cards in the stack of digital note cards, the filtering based at least in part on a highlighting color associated with the selected portion of content included in the digital note cards.

8. The method of claim 2, wherein the digital note card stack includes a plurality of vocabulary digital note cards, where, for each vocabulary digital note card, front of the vocabulary digital note card includes a vocabulary word from a glossary of vocabulary words included with the electronic book and back of the vocabulary digital note card includes a corresponding definition of the vocabulary word.

9. The method of claim 2, comprising:
receiving a user input swiping the first digital note card in the graphical user interface; and
responsive to the received user input, repositioning the first digital note card such that a second digital note card that is below the first digital note card in the stack is at least partly visible on the graphical user interface.

10. The method of claim 1, wherein displaying options for performing an operation on the selected portion of the content comprises:
presenting a heads up display box in the graphical user interface, the heads up display box including the options for performing the operation on the selected portion of the content, and
wherein the heads up display box is presented as an overlay above the displayed content from the electronic book in the graphical user interface.

11. The method of claim 1, wherein displaying the input field for adding user-generated note to a digital note card comprises:
presenting, as an overlay above the displayed content from the electronic book in the graphical user interface, a heads up display box that includes the input field; and
displaying, on the graphical user interface in association with presenting the heads up display box, a virtual keyboard for inputting content corresponding to the user-generated note.

12. The method of claim 1, wherein receiving first user input selecting a portion of the content further comprises:
determining whether the first user input matches predefined input criteria for highlighting the selected portion of the content; and
in response to determining that the first user input matches the predefined input criteria, automatically highlighting the selected portion of the content.

13. An electronic device comprising:
a processor configured to execute instructions stored in a non-transitory machine-readable medium;
an input/output subsystem, operatively coupled to the processor, including an electronic display with a touch sensitive surface for input and output; and
a memory serving the machine-readable medium and storing processor-executable instructions to cause the electronic device to perform operations comprising:
displaying, via the touch sensitive surface, content from an electronic book in a graphical user interface presented on the electronic display;
receiving, via the touch sensitive surface, first user input selecting a portion of the content;
based on receiving the first user input, determining whether the selected portion of the content exceeds a predetermined number of characters, wherein a first set of options for performing operations on the selected portion of the content is displayed if the selected portion of the content is less than the predetermined number of characters and a second set of options for performing operations on the selected portion of the content that includes an option for creating a digital note card is displayed if the selected portion of the content equals or exceeds the predetermined number of characters;
in response to determining that the selected portion of the content equals or exceeds the predetermined number of characters, displaying the second set of options for performing operations on the selected portion of the content;
receiving second user input selecting the option for creating a digital note card;
based on receiving the second user input, displaying an input field for adding a user-generated note to a digital note card; and
creating a first digital note card, where a first side of the first digital note card includes the selected portion of the content, and a second side of the first digital note card includes the user-generated note.

14. The electronic device of claim 13, wherein the instructions cause the electronic device to perform operations comprising:
displaying, in the graphical user interface, the first digital note card in a stack of digital note cards, where the first side of the first digital note card including the selected portion of the content is displayed on the top of the stack.

15. The electronic device of claim 14, wherein the instructions cause the electronic device to perform operations comprising:
receiving, via the touch sensitive surface, a user input requesting to flip the first digital note card over;
responsive to the received user input, visually flipping the first digital note card over in an animated sequence including a series of graphical transitions; and
displaying, in the graphical user interface, the second side of the first digital note card that includes the user-generated note.

16. The electronic device of claim 14, wherein the instructions cause the electronic device to perform operations comprising:
receiving, via the touch sensitive surface, a user input requesting to move the first digital note card to the bottom of the stack of digital note cards, the user input including repositioning the first digital note card in the graphical user interface;
responsive to the received user input, determining whether a position of the first digital note card reaches a predetermined location in the graphical user interface;
based on determining that the position of the first digital note card has reached the predetermined location in the graphical user interface, visually moving the first digital note card to the bottom of the stack in an animated sequence; and
displaying, in the graphical user interface, a front of a second digital note card on the top of the stack, and displaying at least a portion of the first digital note card at the bottom of the stack.

17. The electronic device of claim 14, wherein the instructions cause the electronic device to perform operations comprising:
receiving, via the touch sensitive surface, a user input requesting to move a second digital note card that is at the bottom of the stack of digital note cards to the top of the stack;
responsive to the received user input, visually moving the second digital note card to the top of the stack in an animated sequence including a series of graphical transitions; and
displaying, in the graphical user interface, a front of the second digital note card on the top of the stack, and displaying at least a portion of the first digital note card below the second digital note card.

18. The electronic device of claim 14, wherein the instructions cause the electronic device to perform operations comprising:
receiving user feedback indicating a level of comprehension of content included in a digital note card; and
based on the user feedback, dynamically filtering the digital note cards included in the stack of digital note cards, wherein a subset of digital note cards in the dynamically filtered stack are displayed more often compared to other digital note cards in the stack.

19. The electronic device of claim 14, wherein the instructions cause the electronic device to perform operations comprising:
filtering the digital note cards in the stack of digital note cards, the filtering based at least in part on a highlighting color associated with the selected portion of content included in the digital note cards.

20. The electronic device of claim 14, wherein the digital note card stack includes a plurality of vocabulary digital note cards, where, for each vocabulary digital note card, front of the vocabulary digital note card includes a vocabulary word from a glossary of vocabulary words included with the electronic book and back of the vocabulary digital note card includes a corresponding definition of the vocabulary word.

21. The electronic device of claim 14, comprising:
receiving a user input swiping the first digital note card in the graphical user interface; and
responsive to the received user input, repositioning the first digital note card such that a second digital note card that is below the first digital note card in the stack is at least partly visible on the graphical user interface.

22. The electronic device of claim 13, wherein displaying options for performing an operation on the selected portion of the content comprises:
presenting a heads up display box in the graphical user interface, the heads up display box including the options for performing the operation on the selected portion of the content, and
wherein the heads up display box is presented as an overlay above the displayed content from the electronic book in the graphical user interface.

23. The electronic device of claim 13, wherein displaying the input field for adding user-generated note to a digital note card comprises:
presenting, as an overlay above the displayed content from the electronic book in the graphical user interface, a heads up display box that includes the input field; and
displaying, on the graphical user interface in association with presenting the heads up display box, a virtual keyboard for inputting content corresponding to the user-generated note.

24. The electronic device of claim 13, wherein receiving first user input selecting a portion of the content further comprises:
determining whether the first user input matches predefined input criteria for highlighting the selected portion of the content; and
in response to determining that the first user input matches the predefined input criteria, automatically highlighting the selected portion of the content.

25. A computer program product, encoded in a non-transitory computer-readable medium and including instructions that are operable to cause a data processing apparatus to perform operations comprising:
displaying content from an electronic book in a graphical user interface presented on an electronic display coupled to the data processing apparatus;
receiving first user input selecting a portion of the content;
based on receiving the first user input, determining whether the selected portion of the content exceeds a predetermined number of characters, wherein a first set of options for performing operations on the selected portion of the content is displayed if the selected portion of the content is less than the predetermined number of characters and a second set of options for performing operations on the selected portion of the content that includes an option for creating a digital note card is displayed if the selected portion of the content equals or exceeds the predetermined number of characters;
in response to determining that the selected portion of the content equals or exceeds the predetermined number of characters, displaying the second set of options for performing operations on the selected portion of the content;
receiving second user input selecting the option for creating a digital note card;
based on receiving the second user input, displaying an input field for adding a user-generated note to a digital note card; and
creating a first digital note card, where a first side of the first digital note card includes the selected portion of the content, and a second side of the first digital note card includes the user-generated note.

26. The computer program product of claim 25, wherein the instructions cause the data processing apparatus to perform operations comprising:
displaying, in the graphical user interface, the first digital note card in a stack of digital note cards, where the first side of the first digital note card including the selected portion of the content is displayed on the top of the stack.

27. The computer program product of claim 26, wherein the instructions cause the data processing apparatus to perform operations comprising:
receiving a user input requesting to flip the first digital note card over;
responsive to the received user input, visually flipping the first digital note card over in an animated sequence including a series of graphical transitions; and
displaying, in the graphical user interface, the second side of the first digital note card that includes the user-generated note.

28. The computer program product of claim 26, wherein the instructions cause the data processing apparatus to perform operations comprising:
receiving a user input requesting to move the first digital note card to the bottom of the stack of digital note cards, the user input including repositioning the first digital note card in the graphical user interface;
responsive to the received user input, determining whether a position of the first digital note card reaches a predetermined location in the graphical user interface;
based on determining that the position of the first digital note card has reached the predetermined location in the graphical user interface, visually moving the first digital note card to the bottom of the stack in an animated sequence; and
displaying, in the graphical user interface, a front of a second digital note card on the top of the stack, and displaying at least a portion of the first digital note card at the bottom of the stack.

29. The computer program product of claim 26, wherein the instructions cause the data processing apparatus to perform operations comprising:

receiving a user input requesting to move a second digital note card that is at the bottom of the stack of digital note cards to the top of the stack;

responsive to the received user input, visually moving the second digital note card to the top of the stack in an animated sequence including a series of graphical transitions; and displaying, in the graphical user interface, a front of the second digital note card on the top of the stack, and displaying at least a portion of the first digital note card below the second digital note card.

30. The computer program product of claim 26, wherein the instructions cause the data processing apparatus to perform operations comprising:

receiving user feedback indicating a level of comprehension of content included in a digital note card; and based on the user feedback, dynamically filtering the digital note cards included in the stack of digital note cards, wherein a subset of digital note cards in the dynamically filtered stack are displayed more often compared to other digital note cards in the stack.

31. The computer program product of claim 26, wherein the instructions cause the data processing apparatus to perform operations comprising:

filtering the digital note cards in the stack of digital note cards, the filtering based at least in part on a highlighting color associated with the selected portion of content included in the digital note cards.

32. The computer program product of claim 26, wherein the digital note card stack includes a plurality of vocabulary digital note cards, where, for each vocabulary digital note card, front of the vocabulary digital note card includes a vocabulary word from a glossary of vocabulary words included with the electronic book and back of the vocabulary digital note card includes a corresponding definition of the vocabulary word.

33. The computer program product of claim 26, wherein receiving first user input selecting a portion of the content further comprises:

receiving a user input swiping the first digital note card in the graphical user interface; and responsive to the received user input, repositioning the first digital note card such that a second digital note card that is below the first digital note card in the stack is at least partly visible on the graphical user interface.

34. The computer program product of claim 25, wherein displaying options for performing an operation on the selected portion of the content comprises:

presenting a heads up display box in the graphical user interface, the heads up display box including the options for performing the operation on the selected portion of the content, and wherein the heads up display box is presented as an overlay above the displayed content from the electronic book in the graphical user interface.

35. The computer program product of claim 25, wherein displaying the input field for adding user-generated note to a digital note card comprises:

presenting, as an overlay above the displayed content from the electronic book in the graphical user interface, a heads up display box that includes the input field; and displaying, on the graphical user interface in association with presenting the heads up display box, a virtual keyboard for inputting content corresponding to the user-generated note.

36. The computer program product of claim 25, wherein receiving first user input selecting a portion of the content further comprises:

determining whether the first user input matches predefined input criteria for highlighting the selected portion of the content; and in response to determining that the first user input matches the predefined input criteria, automatically highlighting the selected portion of the content.

\* \* \* \* \*